(12) United States Patent
Binns

(10) Patent No.: US 7,140,022 B2
(45) Date of Patent: Nov. 21, 2006

(54) METHOD AND APPARATUS FOR SLACK STEALING WITH DYNAMIC THREADS

(75) Inventor: Pamela A. Binns, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 1018 days.

(21) Appl. No.: 09/751,955

(22) Filed: Dec. 29, 2000

(65) Prior Publication Data

US 2002/0120663 A1     Aug. 29, 2002

(51) Int. Cl.
G06F 9/46      (2006.01)

(52) U.S. Cl. ............... 718/105; 718/100; 718/101; 718/102; 718/103

(58) Field of Classification Search ........ 718/100–104, 718/105
See application file for complete search history.

(56) References Cited

U.S. PATENT DOCUMENTS

| | | | |
|---|---|---|---|
| 5,448,735 A * | 9/1995 | Anderson et al. | 718/100 |
| 5,455,825 A * | 10/1995 | Lauer et al. | 370/413 |
| 5,796,719 A * | 8/1998 | Peris et al. | 370/231 |
| 5,887,143 A * | 3/1999 | Saito et al. | 709/248 |
| 6,047,354 A * | 4/2000 | Yoshioka et al. | 711/118 |
| 6,189,022 B1 * | 2/2001 | Binns | 718/100 |
| 6,282,561 B1 * | 8/2001 | Jones et al. | 718/104 |
| 6,393,433 B1 * | 5/2002 | Kalavade et al. | 707/200 |
| 6,505,229 B1 * | 1/2003 | Turner et al. | 718/107 |
| 6,567,840 B1 * | 5/2003 | Binns et al. | 718/103 |
| 6,964,048 B1 * | 11/2005 | Isham | 718/104 |
| 2002/0120661 A1 * | 8/2002 | Binns et al. | 709/102 |

OTHER PUBLICATIONS

Alia K. Atlas and Azer Bestavros, "Slack Stealing Job Admission Control Scheduling", Boston University Technical Report 98-009, May 1998.*

Cofer, D., et al., "Using Model Checking for Verification of Partitioning Properties in Integrated Modular Avionics", *IEEE, Digital Avionics System Conference (DASC)*, pp. 1.D.2-1 through 1.D.2-10, (Oct. 2000).

Ripoll, Ismael et al., "An Optimal Algorithm for Scheduling Soft Aperiodic Tasks in Dynamic-Priority Preemptive System," IEEE Transactions on Software Engineering: vol. 23, No. 6, Jun. 1997, pp. 388-399, the whole document.

Binns, Pam, "Incremental Rate Monotonic Scheduling for Improved Control System Performance," Third IEEE Montreal Quebec Canada, Jun. 9-11, 1997, pp. 80-90, p. 80-p. 85.

(Continued)

Primary Examiner—Thomas Lee
Assistant Examiner—Sean Weinman
(74) Attorney, Agent, or Firm—McDonnell Boehnen Hulbert & Berghoff LLP

(57) ABSTRACT

In a multitasking system executing real-time harmonic and dynamic tasks having various priority levels, slack is stolen from both timeline and reclaimed slack to enable the execution of high priority non-essential tasks on a best efforts basis. Counts of the amount of slack consumed, slack reclaimed, and periodic compute time consumed are maintained by individual priority level and dynamically updated at certain times. Idle time is calculated by priority level. Available slack is calculated, and slack is allocated and consumed by rate, with the highest rate first and the lowest rate last. Also described are a computer system and various methods that perform slack stealing in a multitasking system in which dynamic tasks can request activation or deactivation at any time.

38 Claims, 11 Drawing Sheets

OTHER PUBLICATIONS

Atlas, Alia K. et al., "Slack Stealing Job Admission Control*," Technical Report—Boston University, May 2, 1998, pp. 1-14, p. 1-p. 6.

Davis, R.I., "Approximate Slack Stealing Algorithms for Fixed Priority Pre-emptive Systems," Real-time Systems Research Group, Dept. of Computer Science, University of York, England, Nov. 1993, p. 1.

Tia, Too-Seng et al., "Aperiodic Request Scheduling in Fixed-Priority Preemptive Systems," University of Illinois at Urbana-Champaign, Jul. 1994, p. 9-p. 14.

Lehoczky, J.P. et al., "Chapter 8: Scheduling Periodic and Aperiodic Tasks using the Slack Stealing Algorithm," Advances in Real Time Systems, 1995, pp. 172-195, paragrah ' 08/3!.

Audsley, N.C., et al., "Fixed Priority Pre-emptive Scheduling: An Historical Perspective", *Real-Time Systems, 8*, Kluwer Academic Publishers, Boston, pp. 173-198, (1995).

Bettati, R., et al., "End to End Scheduling to Meet Deadlines in Distributed Systems", *Proceedings of the 12th International Conference on Distributed Computing Systems*, Yokohama, Japan, 8 p., (Jun. 1992).

Binns, P., "Incremental Rate Monotonic Scheduling for Improved Control System Performance", *Real-Time Applications Symposium*, Honeywell Technology Center, 11 p., (Jun. 1997).

Binns, P., "Scheduling Slack in MetaH", *Real-Time Systems Symposium, Work in Progress Session*, Honeywell Technology Center, 4 p., (Dec. 1996).

Garcia, J.J., et al., "Optimized Priority Assignment for Tasks and Messages in Distributed Hard Real-Time Systems", *IEEE*, pp. 124-132, (1995).

Gerber, R., et al., "Semantics-Based Compiler Transformations for Enhanced Schedulability", *IEEE*, pp. 232-242, (1993).

Gertz, M.W., et al., "A Human-Machine Interface to Support Reconfigurable Software Assembly for Virtual Laboratories", *IEEE Robotics and Automation Magazine, 1(4)*, pp. 1-8, (Dec. 1994).

Gillies, D.W., et al., "Scheduling Tasks with and/or Precedence Constraints", *SIAM J. Comput., 24 (4)*, Society for Industrial and Applied Mathematics, pp. 797-810, (Aug. 1995).

Harbour, M.G., et al., "Fixed Priority Scheduling of Periodic Tasks with Varying Execution Priority", *IEEE*, pp. 116-128, (1991).

Lehoczky, J., et al., "The Rate Monotonic Scheduling Algorithm: Exact Characterization And Average Case Behavior", *IEEE*, pp. 166-171, (1989).

Lehoczky, J.P., et al., "An Optimal Algorithm for Scheduling Soft-Aperiodic Tasks in Fixed-Priority Preemptive Systems", *IEEE*, pp. 110-123, (1992).

Lehoczky, J.P., et al., "Enhanced Aperiodic Responsiveness in Hard Real-Time Environments", *IEEE*, pp. 261-270, (1987).

Leung, J.Y., et al., "On the Complexity of Fixed-Priority Scheduling of Periodic, Real-Time Tasks", *Performance Evaluation 2*, North-Holland Publishing Company, pp. 237-250, (1982).

Liu, C.L., et al., "Scheduling Algorithms for Multiprogramming in a Hard-Real-Time Environment", *Journal of the Association for Computing Machinery, 20, (1)*, pp. 46-61, (Jan. 1973).

Lugi, "Real-Time Constraints In a Rapid Prototyping Language", *Computer Lang., 18 (2)*, Computer Science Department, Naval Postgraduate School, Monterey, CA, pp. 77-103, (1993).

McConnell, D.J., et al., "Reengineering a Single Threaded Embedded Missile Application Onto a Parallel Processing Platform Using MetaH", *IEEE, Proceedings of the 4th WPDRTS*, pp. 57-64 (1996).

Mok, A.K., et al., "Synthesis of a Real-Time Message Processing System with Data-driven Timing Constraints", *IEEE*, pp. 133-143, (1987).

Penix, J., et al., "Verification of Time Partitioning in the DEOS Scheduler Kernel", *The 22nd International Conference on Software Engineering*, Limeric, Ireland, ACM Press, pp. 1-10, (Jun. 4, 2000).

Saksena, M., et al., "Design and Implementation of Maruti-II", *In: Principles of Real-Time Systems, Chapter 4*, Sang Son, Ed., pp. 72-102, (1994).

Saksena, M., et al., "Guidelines from Automated Implementation of Executable Object Oriented Models for Real-Time Embedded Control Systems", *IEEE*, pp. 240-251, (1997).

Sha, L., et al., "Priority Inheritance Protocols: An Approach to Real-Time Synchronization", *IEEE Transactions on Computers, 39 (9)*, pp. 1175-1185, (Sep. 1990).

Sha, L., et al., "Solutions For Some Practical Problems In Prioritized Preemptive Scheduling", *IEEE*, pp. 181-191, (1986).

Spuri, M., et al., "How to Integrate Procedence Constraints and Shared Resources in Real-Time Scheduling", *IEEE Transactions on Computers, 43 (12)*, pp. 1407-1412, (Dec. 1994).

Stoyenko, A.D., "A Schedulability Analyzer for Real-Time Euclid", *IEEE*, pp. 218-227, (1987).

Sun, J., et al., "Synchronization Protocols in Distributed Real-Time Systems", *IEEE*, pp. 38-45, (1996).

Vestal, S., "Fixed-Priority Sensitivity Analysis for Linear Compute Time Models", *IEEE Transactions on Software Engineering, 20 (4)*, pp. 308-317, (Apr. 1994).

Vestal, S., "MetaH Support for Real-Time Multi-Processor Avionics", *Joint Workshop on Parallel and Distributed Real-Time Systems*, Geneva, Switzerland, 10 p., (Apr. 1997).

Vestal, S., "Mode Changes in a Real-Time Architecture Description Language", *Second International Workshop on Configurable Distributed Systems*, 11 p., (Mar. 1994).

Vestal, S., et al., "Scheduling and Communication in MetaH", *Proceedings of the Real-Time Systems Symposium*, Raleigh-Durham, NC, 7 p., (Dec. 1993).

Xu, J., et al., "Scheduling Processes with Release Times, Deadlines, Precedence, and Exclusion Relations", *IEEE Transactions on Software Engineering, 16 (3)*, pp. 360-369, (Apr. 1994).

* cited by examiner

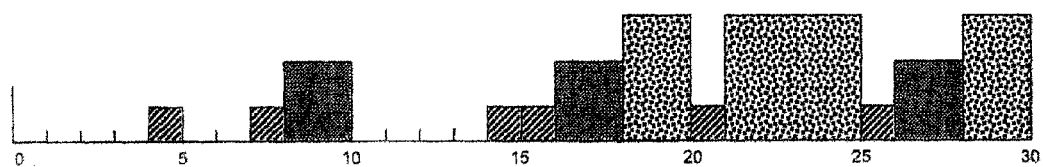
τ₁ ▧  τ₂ ▨  τ₃ ▨  FIG. 7
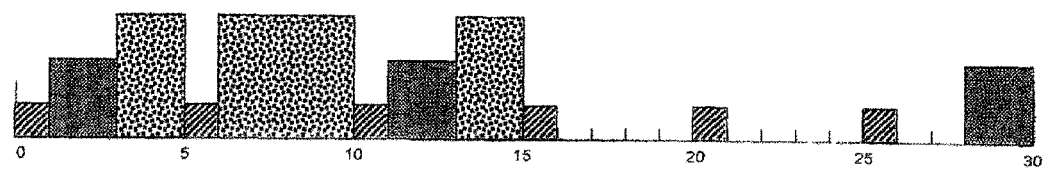
τ₁ ▧  τ₂ ▨  τ₃ ▨  FIG. 8
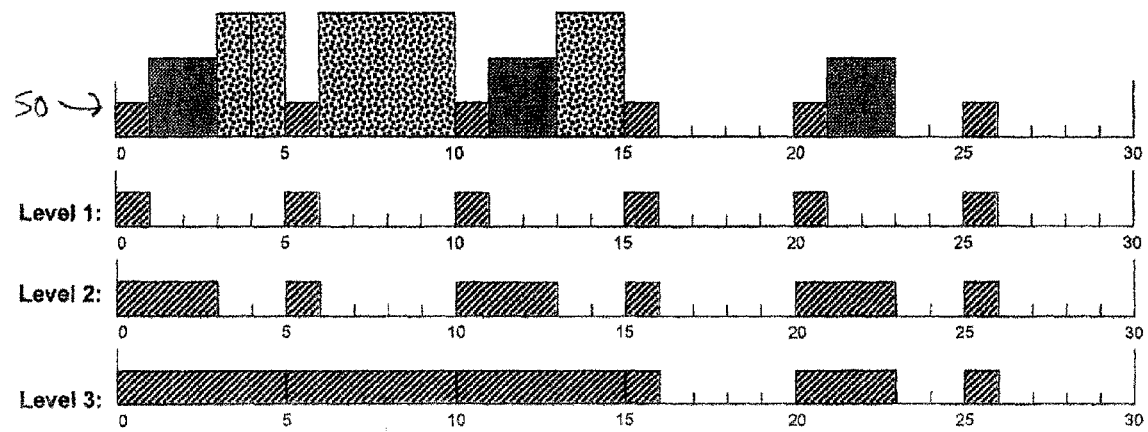
τ₁ ▧  τ₂ ▨  τ₃ ▨  FIG. 9

111 — UPDATE THE ACCUMULATORS UPON THE OCCURRENCE OF AN EVENT FROM THE FOLLOWING GROUP:

- WHEN CROSSING A PERIOD BOUNDARY
- WHEN A TASK COMPLETES FOR PERIOD WHEN EXECUTING ON A FIXED BUDGET WITH SLACK TO BE RECLAIMED
- WHEN A PROCESSOR EXECUTING THE TASKS TRANSITIONS FROM IDLE TO BUSY
- WHEN A TASK COMPLETES FOR PERIOD WHEN EXECUTING ON SLACK
- PRIOR TO CALCULATING AVAILABLE SLACK FOR A NEW SLACK-CONSUMING TASK
- BEFORE MUTEX EXECUTION BY A SLACK-CONSUMING THREAD

113 — PREDECREMENT THE ACCUMULATORS TO ALLOW FOR OVERHEAD ASSOCIATED WITH ALLOCATING SLACK, SUCH AS CONTEXT SWAPS, CACHE REFRESHES, ETC.

115 — ALLOCATE SLACK TO TASKS IN ORDER OF PRIORITY

AN APERIODIC HIGH PRIORITY TASK CAN STEAL SLACK FROM AVAILABLE SLACK WITHOUT IMPACTING AN EXECUTION DEADLINE OF A PERIODIC LOW PRIORITY TASK

117 — END

FIG. 18B

METHOD AND APPARATUS FOR SLACK STEALING WITH DYNAMIC THREADS

RELATED APPLICATIONS

The present application is related to the following applications, which are assigned to the same assignee as the present application:

Ser. No. 09/312,592, entitled "Task Scheduling and Message Passing"; and

Ser. No. 08/914,924, entitled "Slack Scheduling for Improved Response Times of Period Transformed Processes".

The present application invention is also related to the following application, which is assigned to the same assignee as the present application and which was filed on even date herewith:

Ser. No. 09/751,834, entitled "Methods and Apparatus for Sharing Slack in a Time-Partitioned System".

COPYRIGHT NOTICE/PERMISSION

A portion of the disclosure of this patent document contains material which is subject to copyright protection. The copyright owner has no objection to the facsimile reproduction by anyone of the patent disclosure, as it appears in the U.S. Patent and Trademark Office patent files or records, but otherwise reserves all copyright rights whatsoever. The following notice applies to the software and data as described below and in the drawings hereto: Copyright© 1999, Honeywell, Inc., All Rights Reserved.

TECHNICAL FIELD

The present invention relates generally to task scheduling within a multitasking system and, in particular, to determining available slack and allocating slack to high priority, non-critical, dynamic tasks or threads.

BACKGROUND

Computer processes are often subdivided into a variety of functions which may be executed as tasks in serial and/or parallel fashion. These computer processes can be used to gather and act upon information, and to bring about some result in response to the information. These functional task systems find use in a variety of important environments. Examples may include monitor and control of an industrial process, such as a power generation and distribution system, or monitor and control of complex equipment, such as an aircraft or spacecraft.

In real-time systems, such as those mentioned above, execution of tasks can include both periodic tasks and aperiodic tasks. One known way of executing periodic tasks is to use rate monotonic scheduling (RMS). The classical RMS formulation is for strictly periodic task sets. To specify a periodic task set, each of n tasks, say $\tau_i$, where $1 \leq i \leq n$, is associated with a period $T_i$ and a worst-case compute time $C_1$. Each task $\tau_i$ will be dispatched and executed at the rate $1/T_i$, and in worst-case it will consume processor time equal to $C_i$ at each dispatch. Each task is implicitly assigned a priority that is determined by its rate (or equivalently, the inverse of its period), with priority equal to the ranking of the rate.

The RMS scheduler schedules periodic tasks having hard deadlines. Viable real-time systems must also be capable of executing aperiodic tasks, which can have hard deadlines or soft deadlines. It is desirable for a task scheduling system to schedule a mixture of periodic and aperiodic tasks in such as way that all periodic task deadlines are met and the response times for the aperiodic tasks are as small as possible.

In "An Optimal Algorithm for Scheduling Soft-Aperiodic Tasks in Fixed-Priority Preemptive Systems", John P. Lehoczky and Sandra Ramos-Thuel, Real-Time Systems Symposium, IEEE Proceedings, December, 1992, there is described a slack-stealing algorithm. This algorithm creates a passive task which, when prompted for service, attempts to make time for servicing aperiodic tasks by "stealing" all the processing time it can from the periodic tasks without causing their deadlines to be missed. This is equivalent to "stealing slack" from the periodic tasks. The slack-stealing algorithm was demonstrated to provide substantial improvements in the response times for aperiodic tasks. In addition, the slack stealing algorithm was described as further improved by cooperating with a reclaiming algorithm that makes available for aperiodic service any processing time unused by the periodic tasks when they require less than their worst-case execution times.

The slack-stealing algorithm as described above was limited to only a static set of execution threads, i.e. a fixed set of recurring tasks without any new periodic tasks being activated and without any periodic tasks being deactivated. However, actual real-time processing environments typically contain a dynamic set of threads, as certain periodic tasks become active and others become inactive.

Thus there is a significant need in the art for a task scheduler that can provide slack-stealing in a real-time environment that encompasses periodic and dynamic tasks.

SUMMARY

The invention deals with task scheduling for a set of periodic and aperiodic tasks, in an environment wherein threads are dynamic.

In one embodiment, the invention provides a multitasking system executing real-time harmonic and dynamic tasks that can request activation or deactivation at any time (their actual activation or deactivation occurs at their next period boundary). The invention further provides a method of scheduling tasks that includes assigning priority levels to tasks, and determining available slack for tasks at each priority level, taking into account tasks that are activating and inactivating. The method further includes allocating slack to tasks in order of priority.

In another embodiment, the invention provides a multitasking system that includes a processor and a plurality of tasks operating on the processor. Each task of the plurality of tasks is of a task type selected from the group consisting of periodic and aperiodic tasks. Each task of the plurality of tasks has associated with it at least one worst-case execution time. The system further includes an executive in communication with the processor and controlling dispatching of tasks on the processor. The executive includes a first module that determines available slack, taking into account periodic tasks that are activating and deactivating at unpredictable times, and the executive further includes a second module that allocates available slack to aperiodic tasks. In one embodiment, the multitasking system is a flight control system.

In yet another embodiment, the invention provides a machine-readable medium having instructions stored thereon capable of causing a processor to carry out a method. The method includes assigning priority levels to tasks, determining available slack for tasks at each priority level taking into account tasks that are activating and inactivating, and allocating slack to tasks in order of priority.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 7 is a task execution timeline illustrating periodic execution times when there is a continual request for slack consumption at a first level;

FIG. 8 is a task execution timeline illustrating periodic execution times when there is an initial request for slack consumption at a second level for more than 10 units of slack in the interval [15,16];

FIG. 9 illustrates a group of periodic task timelines;

FIGS. 18A and 18B together are a process flowchart encompassing various methods of task scheduling that employ slack stealing in a system executing harmonic and dynamic tasks, in accordance with an embodiment of the invention.

DESCRIPTION OF THE EMBODIMENTS

In the following detailed description of embodiments of the invention, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical, and electrical changes may be made without departing from the spirit and scope of the present inventions. The following detailed description is, therefore, not to be taken in a limiting sense, and the scope of the present invention is defined only by the appended claims.

The Description of the Embodiments is divided into six primary sections, some of which in turn comprise a number of subsections.

In Section 1, an Exemplary Operating Environment is described in conjunction with which embodiments of the invention can be practiced.

In Section 2, a Slack Scheduling Background is provided as a basis for understanding the present invention.

In Section 3, Task Scheduling in Digital Engine Operating System (DEOS) is described. While the present invention is not limited to any particular implementation, it is useful in understanding it to describe one implementation in considerable depth.

In Section 4, Slack Scheduling in DEOS With Dynamic Threads is described.

In Section 5, Methods of Exemplary Embodiments of the Invention and Machine-Readable Medium are provided.

Finally, in Section 6 a Conclusion of the Detailed Description is provided.

Section 1—Exemplary Operating Environment

Figure 1:
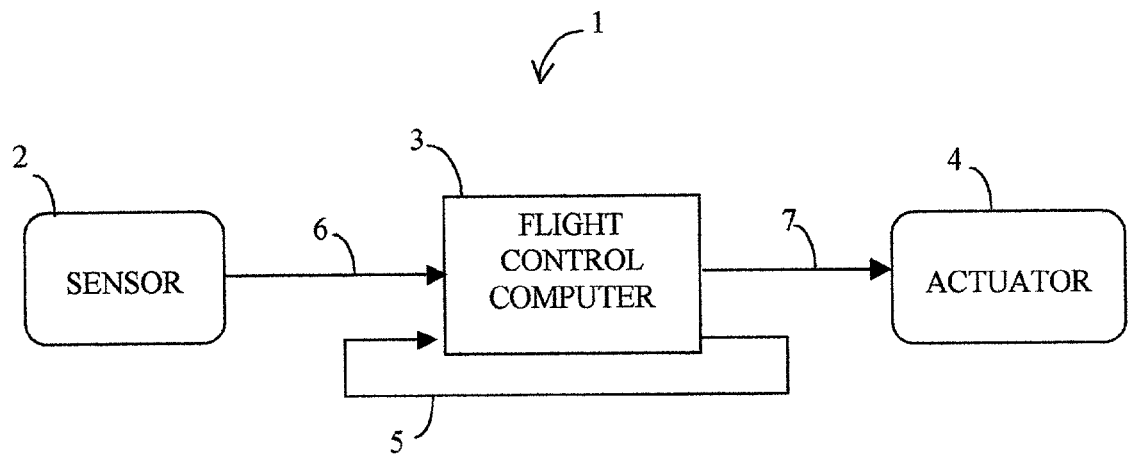
FIG. 1 is a schematic of a flight control system for use in accordance with an embodiment of the invention.

FIG. 1 is a schematic of a flight control system 1 for use in accordance with an embodiment of the invention. Flight control computer 3 executes tasks at some periodic rate. Flight control computer 3 receives sensor data 6 from sensor 2, performs computations with sensor data 6 and, optionally, with state data 5 computed in a previous dispatch as inputs, and generates an output 7 to an actuator 4.

While disclosed in the context of a flight control system, the present invention can be used with many types of data processing systems, such as an industrial control systems, vehicular control systems, communications processors, real-time control systems, general purpose data processing systems, and other types of data processing system whose functional requirements are satisfied by the present invention.

Flight control computer 3 executes applications on top of a multi-threading operating system. In one embodiment, the operating system is the Digital Engine Operating System (DEOS) developed by Honeywell, Inc., Minneapolis, Minn., U.S.A. However, the invention can be implemented on other operating system platforms and is not limited to DEOS. As will be understood by those of ordinary skill in the art, a multi-threaded operating system serves as a "traffic cop" that allows a plurality of computer programs to execute concurrently without interfering with one another.

In one embodiment of the invention, DEOS provides preemptive fixed priority scheduling of periodic and aperiodic tasks. For periodic tasks, priorities are assigned inversely with period or deadline, so that tasks with shorter periods or deadlines have higher scheduling priorities. Aperiodic tasks are also assigned a rate or period that determines the slack request level, but the priorities of aperiodic tasks are dynamic when they are actually running.

In the present invention, slack scheduling is provided for a set of harmonic and dynamic tasks or threads. A "harmonic" task set is defined as one in which the period $T_i$ of each task evenly divides $T_{i+1}$ for i=1, ..., n−1. A harmonic task set comprises a plurality of tasks or threads whose periods are static. A "static" task set is defined as one that comprises tasks that are scheduled at start-up time and that persists over time until the computer is shut down.

A "dynamic" task or thread is defined as a task that can unpredictably start up or finish and that is not scheduled at start-up time. Once executing, a dynamic task can be periodic and predictable, and it can be scheduled in a fashion similar to a static task. Dynamic threads include periodic tasks that can be activated or inactivated at their next period boundary. Dynamic threads also include aperiodic tasks. Dynamic threads can also include slack consumers that dynamically (i.e. at any time) request slack.

In one embodiment, slack-stealing is provided in a multitasking system executing real-time harmonic and dynamic tasks having various priority levels. Slack is stolen from both timeline and reclaimed slack to enable the execution of high priority non-essential tasks on a best efforts basis. The slack available for stealing equals timeline slack plus reclaimed slack minus idle time. Counts of the amount of slack consumed, slack reclaimed, and periodic compute time consumed are maintained by individual priority level and dynamically updated at certain times. Idle time is calculated by priority level. Available slack is calculated, and slack is allocated and consumed by rate, with the highest rate first and the lowest rate last.

Figure 2:
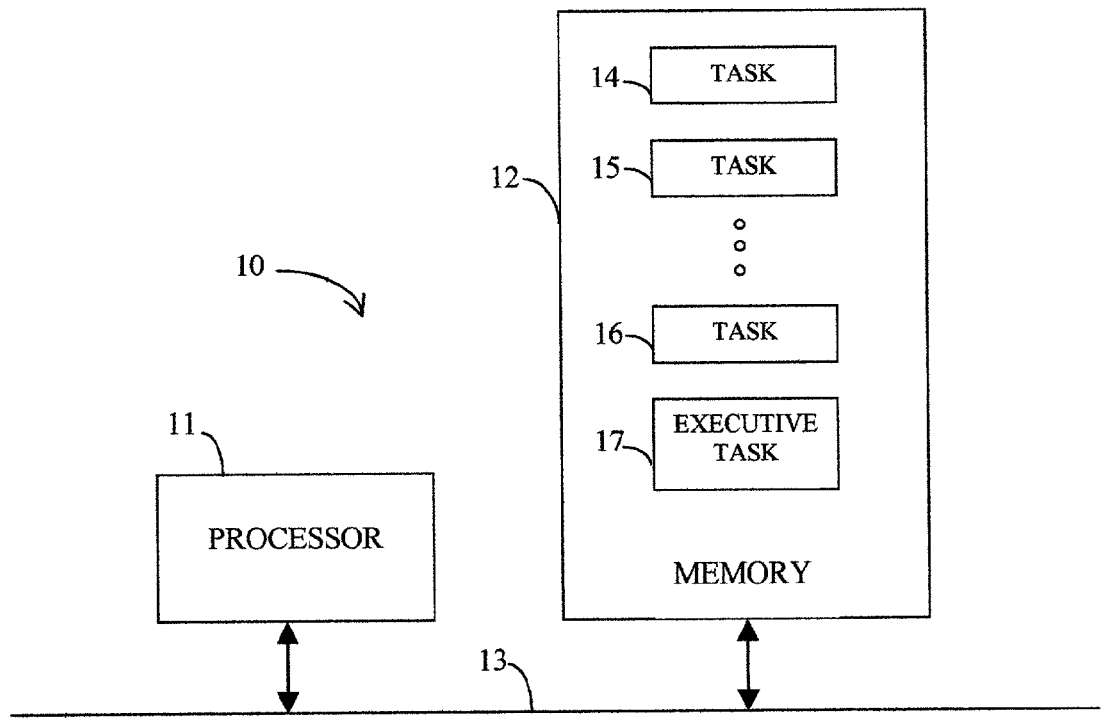
FIG. 2 is a block diagram of a multitask system in accordance with an embodiment of the invention.

FIG. 2 is a block diagram of a multitask system 10 in accordance with an embodiment of the invention. Multitask system 10 comprises at least one processor 11 and at least one memory 12. Memory 12 can be implemented as any one or more memory units which can include random access memory (RAM), read only memory (ROM), cache memory, hard disk, removable memory such as diskettes, flash memory card, optical compact disk (CD), or the like. The particular architectural implementation is not limited and can be designed in accordance with the system's requirements. Thus, some portions of memory 12 may reside within processor 11, such as cache memory and/or RAM.

Memory 12 comprises a plurality of tasks 14–17 of which tasks 14–16 are schedulable application tasks. Executive task 17 is responsible for carrying out a number of supervisory tasks, including the scheduling of application tasks 14–17. Each application task 14–17 is repeatedly dispatched, either at some fixed rate for periodic tasks or in response to some event, for example a software-generated interrupt or other event, for aperiodic tasks.

Section 2—Slack Scheduling Background 2.1 Classical Rate Monotonic Scheduling

As mentioned earlier, classical rate monotonic scheduling (RMS) is for strictly periodic task sets. To specify a periodic task set, each of n tasks, say $\tau_1$, where $1 \leq i \leq n$, has associated with it a period $T_i$ and a worst-case compute time $C_1$. Each task $\tau_1$ is dispatched and executed at the rate $1/T_1$, and in worst-case it will consume processor time equal to $C_i$ at each dispatch.

Between each dispatch of a task $\tau_1$ and its associated deadline, a task must perform a certain amount of work, receiving a certain amount of compute time from the processor. However, the processor may also spend some time working on other tasks between dispatch and completion, during which intervals a task is said to be preempted by other tasks. An important observation to make is that task dispatches, i.e., when a task is placed in a prioritized ready queue, and deadlines, i.e., some system-defined deadline or other constraint for completion of the task, occur at deterministic times for periodic tasks. However, task start time, i.e., when computing of the task begins, and complete times, i.e., when computing of the task is complete, may vary depending on scheduling and compute time requirements.

Tasks are characterized using four primary parameters. The class of a task is either periodic, i.e., regularly scheduled for dispatch, or aperiodic, i.e., dispatched in response to some non-scheduled event. The period $T_i$ of a task is the interval between dispatches of a periodic task, or the minimum interval between event arrivals for an aperiodic task. The compute time $C_i$ of a task is the upper bound on the amount of processor time required for an instance of that task to complete after each dispatch. In practice, the degree of assurance that the actual compute time will not exceed this value varies depending on the task.

The criticality of a task in one embodiment is an integer value used to control scheduling behavior when processors are overloaded, i.e., where some subset of tasks is unschedulable. While such a numerical ranking system is convenient for implementation, other ranking systems may be utilized. The schedulability of a task is affected only by tasks on the same processor having a criticality equal or greater to its own criticality. Lower criticality tasks may exceed their stated compute times, or, for aperiodic tasks, may be dispatched at a higher rate than their stated periods, without causing a higher criticality task to miss a deadline.

Figure 3:
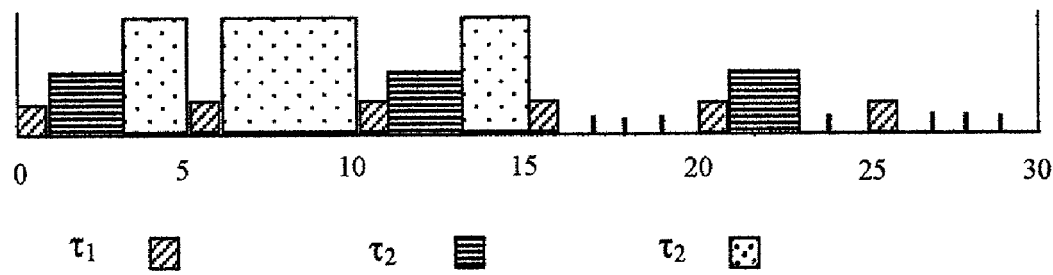
FIG. 3 is a task execution timeline illustrating classic rate monotonic scheduling of three tasks in the prior art.

FIG. 3 is a task execution timeline illustrating classic rate monotonic scheduling of three tasks $\tau_1, \tau_2,$ and $\tau_3$ in the prior art. Tasks $\tau_1, \tau_2,$ and $\tau_3$ have periods $T_1=5$ ms, $T_2=10$ ms, and $T_3=30$ ms, respectively. Tasks $\tau_1, \tau_2,$ and $\tau_3$ also have corresponding worst-case execution times $C_1=1, C_2=2,$ and $C_3=8$, respectively. The "hyperperiod", or least common multiple of periods $T_1, T_2,$ and $T_3$, is 30 in this example.

Each task is implicitly assigned a priority that is determined by its rate (or equivalently, the inverse of its period), with priority equal to the ranking of the rate. In the example illustrated in FIG. 3 of three tasks with periods $T_1=5, T_2=10,$ and $T_3=30$, a priority of 1 is implicitly assigned to $\tau_1$, priority 2 to $\tau_2$ and priority 3 to $\tau_3$. The rate monotonic scheduler is a fixed-priority preemptive scheduler that simply services the task with the highest priority in the ready queue.

Unlike many scheduling algorithms, RMS also has an accompanying analysis that can be used to check whether the schedule is feasible. It is characterized quite simply by what is known as the exact schedulability criteria which is given by $$1 \underset{i \leq n}{\overset{\max}{\leq}} \underset{t \in S_i}{\min} \sum_{j=1}^{i} \frac{C_j}{t} \left\lceil \frac{t}{T_j} \right\rceil \leq 1 \quad \text{Equation (1)}$$

where $S_i = \{k \cdot T_j | j=1, \ldots, i; k=1, \ldots, \lfloor T_i/T_j \rfloor\}$, the set of scheduling points for tasks with priority no greater than i.

To interpret Equation 1, we work through an example illustrating the concepts. Note that Equation 1 applies to non-harmonic task sets as well as harmonic task sets. To describe this example, we will be using some notation that is defined in the accompanying Tables in Appendix A. It may be helpful to refer to the Tables (Appendix A) and then return to this example.

The task set whose timeline execution is illustrated in FIG. 3 is defined in Table 1 (Appendix A).

$S_1$ is the set of all scheduling points for $\tau_1$ that we need not consider beyond to determine scheduling feasibility. For i=1 the range of k is 1, and $S_1=\{6\}$, since the period of $\tau_1$ is 6 time units. For i=2, we consider the scheduling points which we need to check for $\tau_1$ and $\tau_2$. Calculations give $S_2=\{6,7\}$ and $S_3=\{6, 7, 12, 14, 18, 21\}$.

Let $W_i(t)$ be the amount of level i work dispatched in the interval [0,t], where the level i work is the amount of work requested by tasks with priority greater or equal to i (i.e. those tasks with priority 1, 2, . . . , i). Then $$W_i(t) = \sum_{j=1}^{i} C_j \lceil t/T_j \rceil \quad \text{Equation (2)}$$

At time t=0, all three tasks are dispatched, so $W_3(t)=C_1+C_2+C_3=4$. $W_3(t)$ is constant in $[0,T_1)$, since there are no new arrivals in the system until that time. The test $$\min_{t \in S_i} W_i(t) \leq t \quad \text{Equation (3)}$$

then answers whether each dispatch of $\tau_i$ will meet its deadline. In other words, if there exists a t in $S_i$ that satisfies $W_1(t) \leq t$, then every dispatch of $\tau_i$ will complete by its deadline. So $\tau_1$ is schedulable if $W_1(T_1) \leq T_1$, which it is since $W_1(6)=1 \leq 6$.

$\tau_2$ is schedulable if $W_2(T_2) \leq T_2$ or $W_2(7)=2C_1+C_2=3 \leq 7$. So all dispatches of $\tau_2$ will meet their deadlines. $S_3$ has six times in it. If any $t \in S_3$ satisfies $W_3(t) \leq t$, then $\tau_3$ will also meet its deadline. It is easy to check that t=21 satisfies $W_3(21)=4C_1+3C_2+C_3=9 \leq 21$. There may be other points in $\tau_3$ that also satisfy $W_3(t) \leq t$.

Let $h_i = \max_{t \in S_i} W_i(t)/t$ for i=1, . . . , n. Taking the maximum of the $h_i$ over all task priorities renders Equation 1, which decides whether the entire task set is feasible. Returning to our example, $h_1=1/6$, $h_2=3/7$, and $h_3 \leq 9/21$. Thus Equation 1 in our example asks if min ($h_1, h_2, h_3$) $\leq$ min (1/6, 3/7, 9/21) $\leq$ 1, which it is. When the task set is harmonic, which is to say $T_i$ evenly divides $T_{i+1}$ for i=1, . . . , n−1, Equation 1 simplifies notably, which allows for rapid on-line acceptance tests.

Many extensions to make RMS practical in real systems have been developed within the past decade. Among them are allowing for intertask communication and specification of task criticalities (which can defy the implicit rate structure defined by the periods). Worst-case bounds for intertask communication have been developed for a strictly periodic task set. However, effectively modeling communication and executive execution times for mixed periodic and aperiodic task sets remains an area of research in the general case.

For reference, the notation used to describe the periodic task set used for rate monotonic scheduling is summarized in Table 2 (Periodic Thread Specification in Classical RMS) (Appendix A). The term "task" can be thought of as the set of all threads of a certain rate in DEOS, which we call an aggregate thread. The notion of an aggregate thread will be defined more precisely in Section 4 entitled Slack Scheduling in DEOS With Dynamic Threads.

2.2 Classical Slack Scheduling

Classical slack scheduling assumes a fixed set of periodic tasks. Using this set of tasks, a slack table that describes the slack inherent in the timeline is statically computed and stored for use at run-time. At run-time, a set of accumulators keeps track of the amount of time actually consumed by periodic processes (and also the amount of slack reclaimed from them), and the amount of time consumed by aperiodics tasks (where the idle task can be thought of as a special aperiodic task). These values are then added/subtracted to the appropriate amount of precalculated slack to reflect what really happened. Subsequent sections define these operations more precisely.

The notation used for the development of classical slack scheduling is summarized in Table 3 (Slack Scheduling Specification in the Context of Classical RMS) (Appendix A) and will be referenced in subsequent sections.

2.2.1 Timeline Slack and Off-Line Calculation

Figure 4:
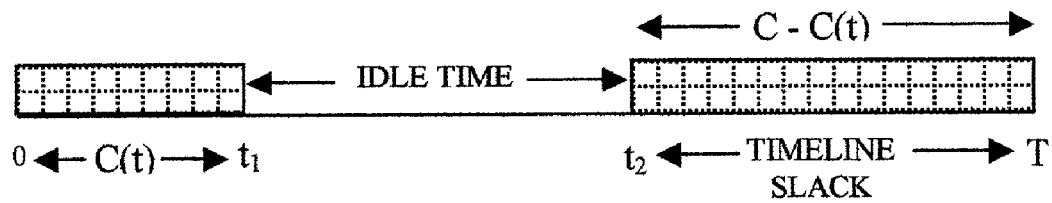
FIG. 4 is a task execution timeline illustrating unclaimed available/unused slack.

FIG. 4 is a task execution timeline illustrating unclaimed available/unused slack. A process has a worst-case execution time equal to C. At t=0, the process begins executing and consumes C(t) execution time. Between $t_1$ and $t_2$, the process halts execution. The process resumes execution at $t_2$ and halts execution at t=T, consuming C—C(t) execution time. Timeline slack is equal to the period T minus the worst-case execution time C. In this example, 0 timeline slack was reclaimed, and the processor was idle 0 time.

Figure 5:
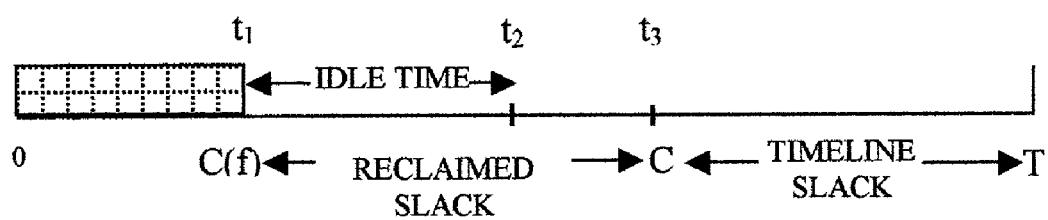
FIG. 5 is a task execution timeline illustrating timeline slack, reclaimed slack, and idle time.

FIG. 5 is a task execution timeline illustrating timeline slack, reclaimed slack, and idle time. A process has a worst-case execution time equal to C. At t=0, the process begins executing and consumes C(f) execution time until it halts execution at $t_1$. Assume that the process does not resume during this period T. The time between $t_1$ and $t_2$ represents processor idle time. Timeline slack is equal to the period T minus the worst-case execution time C (at $t_3$). Reclaimed slack is the amount of slack that can be reclaimed due to the fact that the process halted execution before its worst-case execution time C. In this example, reclaimed slack equals C−C(f) (i.e. $t_3$−$t_1$).

Figure 6:
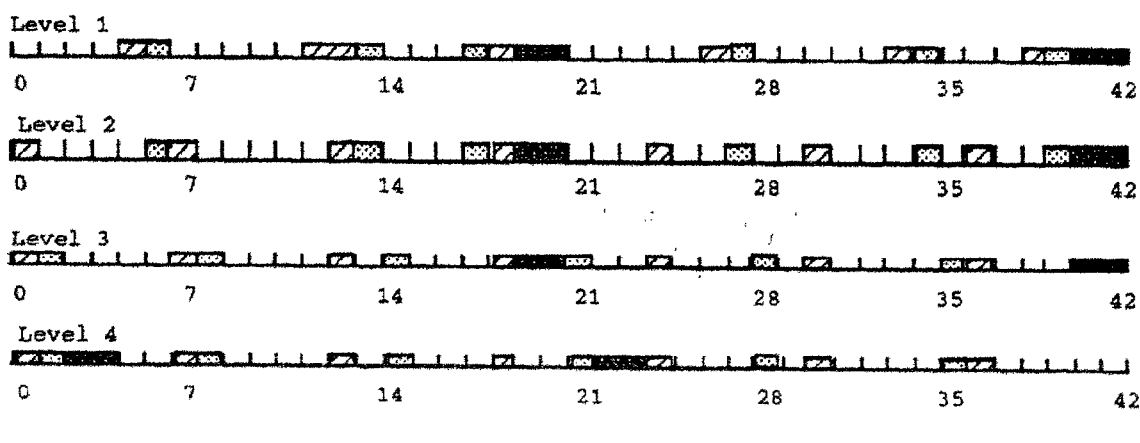
FIG. 6 is a task execution timeline illustrating periodic execution times when there are continual requests for slack consumption by aperiodic tasks at four different slack levels.

FIG. 6 is a task execution timeline illustrating periodic execution times when there are continual requests for slack consumption by aperiodic tasks at four different slack levels. FIG. 6 illustrates slack available at four different slack levels, Level 1 being at the top, and Level 4 being at the bottom. In FIG. 6 there are three periodic tasks $\tau_1$, $\tau_2$, and $\tau_3$ with periods $T_1=6$, $T_2=7$, $T_3=21$ and worst-case compute times $C_1=1$, $C_2=1$, $C_3=2$, respectively. The hyperperiod is 42. The periodic task set properties are summarized in Table 1 (Periodic Task Set) above. Slack allocated at level i means that the executions of dispatches of $\tau_i, \tau_{i+1}, \ldots, \tau_n$ will be delayed as long as possible to allow the task requesting slack to execute. Slack at level n+1 is equivalent to background processing.

Very briefly, the computation of timeline slack is as follows. For each interval $[0,D_{1,j}]=j \cdot T_i$, the amount of level i−1 slack, $L_{1,j}$ is computed. The amount of level i slack in $[0,D_{1,j}]$ is then $L_{i,j}-j C_i$ which is denoted by TimelineSlack$_{i,j}$. The TimelineSlack$_{i,j}$ values are computed off-line and stored in a matrix which is loaded as a part of the run-time executive. For the periodic task set with baseline compute time values described in Table 1, the (TimelineSlack$_{i,j}$) matrix for the timeline slack example are shown in Table 4 (TimelineSlack$_{i,j}$) (Appendix A). The (TimelineSlack$_{i,j}$) matrix is also referred to as the accumulated slack matrix.

For systems that support dynamic activation and deactivation of tasks, such as DEOS, the slack table is not static and must be efficiently recomputed at task activation and deactivation. For activation/deactivation of a task at level i, the values of $L_k$, $m_k$ are decreased/increased for k=i, . . . , n and $m_k=\gamma_k+1, \ldots, H/T_k$ within the current hyperperiod and $m_k=1, \ldots, H/T_k$ for all subsequent hyperperiods (assuming the task set remains fixed). There is an expense incurred while recomputing the slack table, which is discussed in the section entitled Slack Scheduling in DEOS With Dynamic Threads, where slack scheduling is described in greater detail.

Timeline slack can be stolen from tasks having "guaranteed" hard deadlines and made available to high priority non-essential tasks. When stealing timeline slack, execution of hard deadline tasks is delayed as long as possible without causing them to miss their deadlines. Even though they may be delayed, higher priority hard deadline tasks are still executed before lower priority hard deadline tasks.

Another example of timeline slack will now be discussed with respect to FIGS. 7 and 8.

FIG. 7 is a task execution timeline illustrating periodic execution times when there is a continual request for slack consumption at a first level. In the example illustrated in FIG. 7, tasks $\tau_1$ (level 1), $\tau_2$ (level 2), and $\tau_3$ (level 3) have periods $T_1=5$ ms, $T_2=10$ ms, and $T_3=30$ ms, respectively. Tasks $\tau_1$, $\tau_2$, and $\tau_3$ also have corresponding worst-case execution times $C_1=1$, $C_2=2$, and $C_3=8$, respectively. The "hyperperiod", i.e. the least common multiple of periods $T_1$, $T_2$, and $T_3$, is 30 in this example.

The task execution timeline shown in FIG. 7 assumes that a request for timeline slack has been made prior to t=0, and that the request is at the highest priority.

The slack table values for the periodic task set of FIG. 7 are provided in the static TimelineSlack$_{i,j}$ table shown in Table 5 (Appendix A).

Task $\tau_1$ requires only 1 time unit (worst-case) to execute and thus provides 4 time units of timeline slack between each dispatch. When both $\tau_1$ and $\tau_2$ are executing (worst-case) within $\tau_2$'s dispatch period (T=10), $\tau_1$ requires 2 time units and $\tau_2$ requires 2 time units (total of 4 time units), so 6 time units of timeline slack are available at level 2. When $\tau_1$–$\tau_3$ are executing (worst-case) within $\tau_3$'s dispatch period (T=30), $\tau_1$ requires 6 time units, and $\tau_2$ requires 6 time units, and $\tau_3$ requires 8 time units (total of 20 time units), so 10 time units of level 3 timeline slack are available during each hyperperiod.

FIG. 8 is a task execution timeline illustrating periodic execution times when there is an initial request for slack consumption at level 2 for more than 10 units of slack in the interval [15,16]. The periodic task set for FIG. 8 is identical with that in FIG. 7. The task execution timeline shown in FIG. 8 assumes that a request for timeline slack has been made at t=21 by an aperiodic process having level 2 priority. At t=21, the available level 2 slack is represented by the notation AS(2, 21) and equals 6 time units. Also, at t=21 the time idle at level 1 is represented by the notation I(1,21) and equals 21–5=16; the time idle at level 2 is I(2,21)=21–5–4=12; and the time idle at level 3 is I(3,21)=21–8–5–4=4.

FIG. 9 illustrates a group of periodic task timelines. The periodic task set for FIG. 9 is identical with that in FIG. 3. The top line 50 in FIG. 9 is identical to that of FIG. 3. Level 1 represents a periodic task timeline for tasks of priority 1. Level 2 represents a periodic task timeline for tasks of priority 1 and 2. Level 3 represents a periodic task timeline for tasks of priority 1–3.

For tasks $\tau_1$ through $\tau_n$ each timeline shown in FIG. 9 comprises alternating level i busy (B) and idle (I) intervals. Every level i busy period B(i) is contained in a level (i+1) busy period B(i+1). Every level (i+1)idle period I(i+1) is contained in a level i idle period I(i). The timeline repeats every hyperperiod, so idle and slack accumulators can be reset.

2.2.2 Reclaimed Slack

When using slack scheduling, slack can be reclaimed from tasks that complete in less than their worst-case execution times. Reclaimed slack can be stolen from tasks having "guaranteed" hard deadlines and made available to high priority non-essential tasks. Reclaimed slack can only be stolen after the execution of hard deadline tasks.

Figure 10:
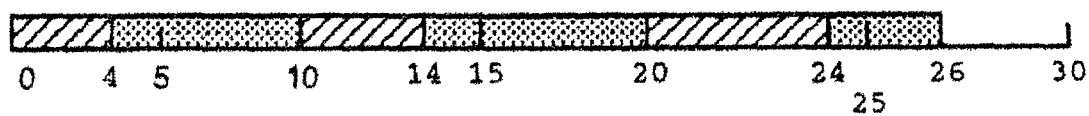
FIG. 10 is a task execution timeline illustrating a worst-case timeline.

FIG. 10 is a task execution timeline illustrating a worst-case timeline. In FIG. 10 there are two periodic tasks $\tau_1$ and $\tau_2$, with periods $T_1=10$ and $T_2=15$, and with worst-case compute times $C_1=4$ and $C_2=7$, respectively. The hyperperiod is 30. FIG. 10 illustrates the case where both tasks consume their worst-case execution times. Only 4 time units are not used.

Figure 11:
FIG. 11 is a task execution timeline illustrating slack reclamation from unused compute times.

FIG. 11 is a task execution timeline illustrating slack reclamation from unused compute times. Using the identical periodic task set as described above for FIG. 10, FIG. 1 illustrates the case where task $\tau_1$ uses less than its worst-case execution time, so that the first dispatch of $\tau_2$ completes execution at time 8 rather than time 15 as in FIG. 10.

Classical RMS automatically reclaims unused execution time, but it does not keep track of how much slack has been reclaimed, and so it cannot guarantee how much it can allocate to other tasks.

2.2.3 Slack Scheduling Run-Time Calculations

This section defines slack scheduling calculations made at run-time. There are two basic operations: update slack variables and calculate available slack.

Pseudo-code for updating slack variables is provided by Algorithm (1) in Appendix B. Algorithm (1) updates the idle slack variables used when computing slack availability. Update_time equals the worst-case time to execute this routine, a constant (possibly based on i). Algorithm (1) is called when a periodic task (which has not overrun its execution time allotment) completes. In theory, tasks can overrun their execution time allotment, and the slack algorithms still work correctly, perhaps producing negative slack values. In practice, when timers expire (corresponding to exceeding an execution time allotment), the timer's value beyond that point has lost track of time and often the return from timer interrupt does not leave internal registers in predictable states. Thus, when a timer expires, the values returned will not reflect the actual time usage, and the slack calculation from that point forward will not be reliable.

Pseudo-code for updating aperiodic slack variables is provided by Algorithm (2) (Appendix B). Algorithm (2) updates the aperiodic slack variables used when computing slack availability. It is called whenever an aperiodic task completes, which might include surplus compute time for a periodic task increment, or when the idle task completes, or when a newly arriving request for slack occurs. Update_time equals the worst-case time to execute this routine, a constant (possibly dependent on i). The aperiodic task t may execute over several time increments; i.e., it may be scheduled, consume all slack, suspend itself, be rescheduled when more slack is available, etc.

Currently, an aperiodic task is one of the following three types of tasks: an interrupt service routine (ISR) thread, the idle process, or any periodic task that did not complete in its original time allotment and that requested slack to complete. In the last type of aperiodic task, the remainder of the incomplete periodic task is called a task increment.

Pseudo-code for calculating slack available is provided by Algorithm (3) (Appendix B). Algorithm (3) calculates the slack available beginning at the time of the call and ending at the end of the period defined by $T_i$, assuming no new threads were created and no existing threads are destroyed. This algorithm is called only when a task would like to consume slack. The requesting task is assumed to have called updateAperiodicSlackVariables when necessary to update slack variables prior to calling function AvailableSlack. Note that in practice, if the available slack is less than some value $\delta$, function AvailableSlack would return the value zero. $\delta$ is a system defined quantity where it would not be worth allocating slack. Clearly $\delta$ is smaller than the time to do a context swap. One might want to choose $\delta=3$ or 4 context swaps, for example, or perhaps smaller depending on the expected execution times of the slack-consuming threads.

Two things to keep in mind with respect to DEOS are (1) the update of slack variables need only occur once per "aggregate" task set rather than at the completion of every task and (2) slack will need to be recalculated whenever tasks of higher priority are created or destroyed. The details of these modifications are provided in Section 4 entitled Slack Scheduling in DEOS With Dynamic Threads.

Other required procedures will be a hyperperiod reset which zeroes all slack accumulators, and an initialization routine that zeroes the slack accumulators (if the initialize hyperperiod isn't called immediately after), allocates the slack queues, and zeroes the task (or period) identifiers. These algorithms are again provided in Section 4 entitled Slack Scheduling in DEOS With Dynamic Threads.

2.3 Computing Blocking Times and Overheads

Threads that access binary semaphores (mutexes) in DEOS use a protocol known as the Highest Locker Protocol (HLP), which assigns to any thread locking a monitor the highest priority of any thread that can lock that monitor. The assignment is made at the time the lock is granted and held until the thread releases the lock.

In one embodiment of DEOS slack scheduling, slack is granted only on a "best-effort" basis. No guarantees are made about the slack already granted to a thread. It could be taken away (by a higher priority slack-consuming thread) at any time the thread is not executing a critical section or is not at the head of a resource queue.

Overhead accounting for slack-consuming threads occurs in the following circumstances:

When a slack-consuming thread is put on a queue waiting for a resource (one of a mutex, a semaphore, or an event), a sufficient amount of slack must be predecremented from the slack accumulators to allow for processing the resource request when/if it reaches the head of the resource queue list.

When a slack-consuming thread preempts a thread not executing on slack, the idle accumulators must be pre-incremented to reflect the possible execution time lost due to overhead, such as context swaps and likely cache refreshes. This increment is added to the thread being preempted. The accounting mechanism can be the one used in DEOS for preemptions caused by ISR threads. Note: (1) this applies to preemptions of both periodic and ISR threads not consuming slack and (2) no increment is computed when a slack-consuming thread preempts another slack-consuming thread (periodic or ISR). (2) follows since slack consumption is best effort.

Just before executing a mutex, the slack accumulators must also be decremented by the worst-case execution time of the mutex.

In all cases above, if sufficient slack is unavailable, then the thread will not be granted its request, and placed back on the slack request queue. In subsequent sections, these algorithmic rules will be made more precise.

As a final note, if slack allocation is guaranteed, then all of these cases fall under a single guarantee mechanism. Algorithms for preallocation of slack can be found in published literature.

Section 3—Task Scheduling in DEOS

This section defines the various task scheduling constructs in DEOS. At least five basic types of constructs need to be clearly defined and delineated so that feasibility of slack scheduling can be assessed. They are:

the basic thread scheduling services provided by DEOS to applications,

DEOS acceptance test algorithms for thread creates/starts and kills/stops, the DEOS time-charging policies for scheduling services, slack accumulators' scope for time partitioned threads, and recovery of slack variables in response to system faults and/or power up/down.

These five topics are addressed below.

First, a brief introduction to the DEOS architecture is provided.

3.1 The DEOS Architecture

The implementation of various embodiments of the invention within the DEOS architecture should not be construed as limiting, because the present invention can be implemented in many alternative embodiments than those illustrated and described herein.

Several concepts are critical for understanding how the design of the DEOS implementation affects the design of the scheduling algorithms and feasibility analyses. It should be noted that explicitly represented information in the design may only appear implicitly in the actual implementation in the sense that it is observable over time, but not at every instant in time. Nonetheless, stating things explicitly serves as a conceptual aid for understanding the implementation behavior. Four concepts related to the application of slack scheduling are: thread states, thread types, thread wait states (which are special cases of thread states), and time partitioning.

3.1.1 Thread States

Each thread may be viewed as having a life cycle which is represented as a sequence of one or more of the following states: NotCreated, Dormant, CompleteForPeriod, Ready, WaitingForPredecessor, Running, ActivelyWaitingForResource, or PassivelyWaitingForResource. In the last two states, a resource is an event, a semaphore, or a mutex. These are defined in greater detail in Section 3.1.3. A thread usually changes state in response to executing one of the DEOS services. It will also change state if it exceeds any resources limits (such as time allocations) that it had been granted.

For ease of exposition, we define a thread to be Active if it is either in state Ready, Running, WaitingForPredecessor or ActivelyWaitingForResource. The active status for the waiting states will depend on the final definition of the waiting states. In particular, a thread that is CompleteForPeriod or is PassivelyWaitingForResource is not active and its unused compute time can be reclaimed as slack.

Each thread has a Boolean value Slack indicating whether the thread, when enabled will make requests for slack or not. In addition, for those threads specified as slack consumers, a distinction between ExecutingOnSlack, and not executing on slack is made for more efficient budget accounting of overheads.

3.1.2 Thread Types

There are two types of threads in DEOS, periodic and Interrupt Service Routine (ISR). Periodic threads can be either static or dynamic, the former being named and allowed to participate in schedule before relationships. ISR threads can be thought of as being "dispatched" by an interrupt. ISR threads are also sometimes called aperiodic threads and are always dynamic. Both ISR and periodic threads may request slack in addition to their fixed budget, provided their budget has been specified as slack-consuming in addition to a fixed budget (i.e. Slack is true) and slack functions are specified as "on".

In general, there are no guarantees for the granting of slack, nor for the consumption of it once it has been granted. We use the term "best effort" for this policy. In other embodiments, the slack scheduler may support on-line acceptance tests for slack allocation to promote fairness, especially to lower priority slack requesters.

Both periodic and ISR threads have rates associated with them. The inverse of a thread's rate is its period. The set of rates at which a thread can be selected are fixed at cold start. Static periodic threads have rates that cannot change between activations. Dynamic threads can be assigned any of the available rates upon creation. ISR threads are always assigned the highest rate, and the priorities of the ISR threads are unique, and higher than all other user defined threads in the process. Both periodic and ISR threads are given a budget, which is the maximum amount of time (or normalization thereof) it can consume during its period. Additionally, both periodic and aperiodic threads can be declared as slack requesters (Slack=true) or not (Slack=false).

All periodic threads with equal rates have equal priorities. We call the collection of all periodic threads of the same rate an "aggregate thread". The order in which threads of the same rate receive service is indeterminate when not otherwise defined by a schedule_before relationship. The notion of an aggregate ISR thread is a partial one, at best. This follows since not all ISR threads are dispatched at the same time, and hence sequences which admit lower priority threads to run between two ISR thread in the same highest rate period are quite plausible. As long as no threads are ExecutingOnSlack, idle accumulator updates need only occur when transitioning from a thread running at rate R to a thread running at a slower rate. Before every slack request is evaluated, idle accumulator updates are necessary.

Both periodic and ISR threads can access mutexes. Mutexes also have a budget, and each access to the mutex is timed. Periodic threads execute only once per period and consequently, the number of mutex accesses per period is known for periodic threads. The compute time of a periodic process includes the execution times of the mutexes. Note that this inclusion of the mutex execution time is in addition to the blocking terms that must also be included in the feasibility analysis.

ISR threads also have a budget but are not restricted to execute once per period. In one embodiment, all ISR threads are scheduled at the highest rate (i.e. the shortest period). Since there is no hard limit (in practice, the hardware always imposes a hard limit, since the time to respond to an interrupt is not zero) on the number of times an ISR thread can execute per period, an accounting mechanism has been devised that effectively transfers some budget from the ISR thread doing the preemption to the thread being preempted. With minor modification, this budget transfer mechanism can be applied to slack requesters, which like ISR threads, are randomly arriving, and the number of requests per period is not known in advance. DEOS time-charging policies and their relationship to slack requests are described in Section 3.4.

3.1.3 Thread Wait States

Threads can wait for resources, where a resource is either a semaphore or an event. We assume that a mutex is considered to be a special case of a binary semaphore with respect to waiting policies. Consequently, mutex waiting policies are not treated as a special case. The lock operation is to be interpreted as a wait operation, and the unlock operation is to be interpreted as a signal operation where the maximum count for a mutex is one.

When waiting to execute a semaphore, the thread is really waiting for the semaphore to count to less than its maximum count. Events that lead to scheduling threads at random times in DEOS are interrupts (triggering an ISR thread) and threads waiting for an event to occur. Three types of waits are supported in DEOS: IndefiniteTimeout, LongDurationTimeout, and ShortDurationTimeout.

We assume that any time a thread suspends itself in response to a resource Long Duration or Indefinite Duration request response, that the remainder of the thread's budget minus time for some overhead processing is given to slack. If the thread has successors, the thread is CompleteForPeriod at the time of suspension. Otherwise, if the thread's budget is specified as having a slack component, it will be placed on the slack request queue, in addition to the resource wait queue.

The notation used in Algorithms 4–6 is meant only to be suggestive and does not necessarily reflect notation used in the DEOS implementation. All types of timeouts are applicable to mutexes, semaphores and events. In the following algorithms, let c be the calling thread, and e (or r) be the event (resource) for which the calling thread is waiting.

Pseudo-code for handling an indefinite timeout is provided by Algorithm 4 (Appendix B). In Algorithm 4, queue_time(c) and resource_time(r) require definition. First, queue time depends on thread type (ISR, periodic) and/or thread state attribute ExecutingOnSlack. If the thread is an ISR thread or a periodic thread that is executing on slack, then queue_time(c) is set to 2*(cswap+delta) plus cachebonus. If the thread type is a periodic thread that is not executing on slack, then queue_time(c) is cswap plus delta.

The value for resource_time(r) depends on the resource r and also on the thread c receiving access to r. If r is a mutex or semaphore, then resource_time(r) is the execution time of r plus overhead incurred for context swap. If r is an event, then r is simply the overhead for context swap. (The time to pulse an event is charged to the pulsing thread, not the waiting thread.) The context swap overhead is defined by queue_time(c).

Pseudo-code for handling a long duration timeout is provided by Algorithm 5 (Appendix B). The only difference between Algorithm 5 and Algorithm 4 is keeping track of the number of iterations. Overhead accounting is identical.

Pseudo-code for handling a short duration timeout is provided by Algorithm 6 (Appendix B). Note that when a thread gives up its budget to slack, no guarantees are made that the remainder of its budget can be reclaimed prior to its next period. Both ISR and periodic threads can give up portions of their budgets to slack. Unless a thread will complete for period, it must always maintain enough budget to allow it to run on slack, if resumed.

Since no guarantees are made about semaphores (excluding monitors), no slack predecrements are made for the execution of code associated with semaphores. Since semaphores are not critical sections (and do not change priorities), preemptions are permitted.

In other embodiments, ISR threads may be supported at rates other than the highest rate. Slack stealing could then provide a mechanism for improved response time of ISR threads.

3.1.4 Time Partitioning

In one embodiment, the following assumptions are made regarding time partitioning. DEOS applications comprise a collection of processes. A process is a collection of threads. Each process is allocated a portion of the total CPU bandwidth, so processes are used to create a form of time partitioning. Each process can be considered a partition. Each thread belongs to a single partition.

Each partition is "guaranteed" a certain amount of time or budget. At system startup, each process is given its "process utilization bound" which is a factor in the computation for schedulability tests when threads are started and/or created. A process' budget equals its process utilization bound times the hyperperiod, where the hyperperiod is the least common multiple of all periods in the system. No task is allowed to exceed its execution time budget.

We also note that blocking times are calculated at the system level, not at the process level. An outline of the calculations can be found in Section 3.3.2.

Every process has a Primary_Thread that is either active or inactive. When inactive, the Primary_Thread's budget is part of timeline slack. The Primary_Thread performs system level functions and is not defined by the application developer. The primary thread's budget is defined implicitly by the process' budget and all active threads in that process. The primary thread's budget ranges anywhere from zero to the process' maximum budget, depending on what other threads are active in the process.

When a process is first started, the primary thread's budget is equal to the process' budget. In practice, at process initiation, only the process' primary thread is active, and moreover it may consume a lot of execution time for initializations, etc. thereby requiring a large allotment of CPU time at least initially. After initializations, new threads could be started, reducing the primary thread's budget allotment.

For ease of exposition, we assume that the primary thread's budget is an explicit quantity that is decreased when threads within the process are started/created and increased when threads are stopped/deleted.

Roughly speaking, schedulability analysis applies to each process, and the entire system is said to be schedulable only if every process is feasible. Note that system feasibility does not imply that each process' schedule is feasible. It is permissible to share mutexes across partitions, and in this case the mutex budget is taken from the system budget rather than from the budgets of each of the processes with threads that access the mutex. This is an optimization that takes blocking times out of the process' feasibility tests and moves it to a system level test. These details are presented more precisely with the on-line acceptance test in Section 3.3.

Other assumptions are that the set of rates in the system are harmonic and fixed. Threads and partitions are dynamic. Activations and deactivations occur at the next period boundaries of the threads. On-line acceptance tests are used for admission of threads and partitions.

3.2 Scheduling Services Provided by DEOS

Table 6 (Thread Services) (Appendix A) identifies the DEOS Thread Services that relate to slack scheduling. These thread services will now be discussed.

3.2.1 Create Thread

Relevant inputs to CreateThread are period and cpu_time.

For dynamic threads, the thread is not only created but also started. See StartThread for the on-line acceptance test used and conditions when the thread will be started.

For static threads, this operation is like a no-op from the slack scheduler's perspective. For static threads the actual schedulability tests are done in procedure StartThread before the thread is activated. To perform them in CreateThread would be pessimistic since not all static threads need be simultaneously active.

All static threads and any schedule before relationships are done when this procedure is called. Static checking for things like allowable stack size, legality of names and rate, and perhaps legality to semaphore accesses are done in this routine.

3.2.2 Start Thread

This operation applies only to static threads, although the slack updates that apply to creation of dynamic threads are provided here. If the addition of this thread still results in a feasible schedule, the dormant thread is put in state CompleteForPeriod for the remainder of the current period and dispatched (i.e. made ready) at the start of the next period. From a scheduling point of view, this service is a no-op if the thread is not in the dormant state at the time of call or if the resulting schedule with this thread included would be infeasible.

Section 3.3 describes an on-line acceptance test that can be used to determine whether admission of a thread would result in an infeasible process schedule. If addition of the thread results in a feasible schedule, the thread will be started; otherwise an error condition will be returned.

If the process' PrimaryThread is active, then the budget for starting/creating a new thread comes from the primary thread's budget. Two slack updates are needed in this case. First, the reserved time allocated for the primary thread will be reduce resulting in increased timeline slack at the primary thread's slack level, and secondly a reduction in timeline slack must be made for the new thread being allocated, in that order. If the process' PrimaryThread has been stopped, then prior to starting a thread, a reduction in timeline slack must be made. Thus, less work is involved in updating slack variables when the PrimaryThread is not active. The slack variable updates needed to reflect the creation/start of a thread are provided below.

When slack variables are updated, some complications for slack reallocation can arise. In particular, what happens to a level k thread that is currently consuming slack? If the TimelineSlack$_{i,j}$'s are updated, then the slack-consuming thread will need to recompute slack availability once it returns to the head of the ready queue. It is desirable to minimize the number of times the slack availability computation is to be made. In particular, if the slack availability has not changed (except possibly for the addition of reclaimed slack), then only a single slack computation should occur. Optimizations to this effect are given in greater detail in Section 4 entitled Slack Scheduling in DEOS With Dynamic Threads.

For slack sharing among processes, in theory, no threads will be allocated that violate a process' utilization bound, so slack-consuming threads that result in the process' task set consuming more than it utilization bound must be restricted to best-effort threads. Conditions for when critical or essential threads (i.e. threads with hard deadlines) may use slack are also discussed in Section 4 entitled Slack Scheduling in DEOS With Dynamic Threads. The primary concern here is that the slack update times must be restricted in number (which seems possible if slack is only used to reduce response times for already guaranteed bandwidth) so that the compute budget is not consumed computing slack availability an undue number of times. Best-effort threads can always attempt to use slack, but no guarantees about slack availability are made.

Shown below are some of the slack variable updates required for activation of a thread when the process' PrimaryThread has been stopped. Additional updates are required to decrease the primary thread's utilization if it has not been stopped. More detailed algorithms are given in Section 4 entitled Slack Scheduling in DEOS With Dynamic Threads. All of these slack variable updates are charged to the thread making the call as part of the execution time of create/start thread.

If StartThread (or CreateThread for dynamic threads) is called for a thread of rate i in the $\gamma_1^{th}$ period (since the beginning of the current hyperperiod), the value TimelineSlack$_{k,\gamma k+1}$ needs to be updated for k=i, ..., n assuming adding the thread still results in a feasible schedule.

At time $\gamma_k \cdot T_k$, TimelineSlack$_{k,\gamma k+1}$ was initialized to TimelineSlack$_{k,\gamma k}+(T_k-C_{k,\gamma k})$. Then at each call to start/create thread, the following updates are necessary:

$$A_{k,\gamma k+1} = A_{k,\gamma k+1} - ((\gamma_k+1)n_{ki}-\gamma_i) \cdot \text{cpu\_time} \qquad \text{Equation (4)}$$

for k∈{i, i+1, ..., n}.

cpu_time is the worst-case execution time of the thread being created. Note that the calculations for TimelineSlack$_{k,\gamma k+1}$ begin when the calculation for TimelineSlack$_{k,\gamma k}$ is available for use. In theory, we wish to calculate TimelineSlack$_{k,j}$ for k∈{i,i+1,...,n} and j∈{$\gamma_{k+1}, \gamma_{k+2}, \ldots$, H/T$_k$, but not only can new threads be started in the next period of rate i but with harmonic tasks, the two dimensions of the (TimelineSlack$_{i,j}$) matrix can be collapsed to a vector with length equal to the number of rates. A derivation of these reductions and calculations is provided in Section 4 entitled Slack Scheduling in DEOS With Dynamic Threads. The times when these updates are made and at what levels (updates don't apply at the same time to each level) are also provided in Section 4.

3.2.3 Start Threads

All dormant threads specified are started. For active threads in the list, no operation is taken in terms of scheduling. For each dormant thread, the appropriate values of the TimelineSlack$_{k,\gamma k+1}$'s need to be updated for k=i, i+1, ..., n and the process_cpu time variable needs to be appropriately decremented. Conceptually, procedure StartThread is called for each dormant thread in the input list. In practice, there is less overhead to call this routine once than to call StartThread many times.

3.2.4 Restart Thread

An active thread is restarted. If the thread was not active, the result of this service call is a no-op from a slack scheduling point of view.

From a scheduling point of view, an active thread's state is changed to CompleteForPeriod and it is suspended to the end of the period at which point it will be rescheduled.

Slack can be reclaimed during this routine. Specifically, when the thread's state is changed to CompleteForPeriod, this is viewed as a thread completion and so the same updates take place that would occur at thread completion. More specifically, the amount of reclaimed slack is worst_case_exec_time(thread)—actual_exec_time(thread), where thread is the thread being restarted.

If thread is scheduled to execute at (slack) level i, then the slack accumulators are (ultimately, depending on whether updates are deferred to the completion of aggregate threads) updated as shown in Algorithm 13 (Appendix B). If updates are executed only upon the completion of an aggregate thread or when scheduling an aperiodic, the parenthesized "ultimately" clause is invoked, and the reclaimed slack will be stored locally until an aggregate update is made. A more detailed description for this can be found in Section 4 entitled Slack Scheduling in DEOS With Dynamic Threads.

If the thread was executing a mutex, the mutex is unlocked by the restart routine. The execution time counters need to be adjusted to reflect this. The mutex status indicates that it was unlocked as the result of a thread restart. Updating execution times for threads that have mutexes locked appears to have no unusual affect on slack variable updates.

Note that if a thread is restarting itself, then the reclaimed slack cited above must be decremented further by the time it takes to execute this routine, otherwise this time is charged to the thread invoking the execution.

3.2.5 Kill/Stop Thread

In one embodiment of DEOS, only static threads are stopped. Stopped static threads can then be killed. Dynamic threads are killed, which has the effect of stopping it and then killing it. The thread's state becomes NotCreated. Only an active or dormant thread can be killed.

Slack variable updates may be made when either a dynamic thread is killed or a static thread is stopped. No updates are made when a stopped static thread is killed. If the process' PrimaryThread is active (i.e. has not been stopped) then the budget of the thread being killed/stopped goes back to the primary thread's budget. If the process' PrimaryThread is stopped, the budget of the thread being killed/stopped goes to the slack pool.

When the budget goes to slack (i.e. when the primary thread has been stopped), for a thread with rate i with the stop/kill service executed in period j, the value of TimelineSlack$_{i,j+1}$ is incremented by the thread's allocated cpu_time which becomes available for slack at the start of the next period at rate i. Just as in start/create thread, these slack updates will require new slack availability calculations for threads currently executing solely on slack. When thread's process' PrimaryThread is active, the budget of the thread being killed/stopped is returned to the primary thread's budget, which also requires updating timeline slack variables.

The timeline slack variable updates for returning a level k stopped/killed thread's budget to the slack pool at the start of the $\gamma_{k+1}^{st}$ period of $T_k$ are provided below.

TimelineSlack$_{k,\gamma k+1}$ is initialized to TimelineSlack$_{k,\gamma k}$+ $(T_k-C_{k,\gamma k})$ at time $\gamma_k \cdot T_k$. At every killThread (or stopThread) operation, $$A_{k,\gamma K+1}=A_{k,\gamma k+1}+((\gamma_k+1)n_{ki}-\gamma_i)\cdot \text{cpu\_time} \qquad \text{Equation (5)}$$

for $k \in \{i, i+1, \ldots, n\}$.

The budget of the thread being killed is cpu_time, which is available once per every $T_k$ units of time. This deallocation policy applies to all hard-deadline (periodic and ISR) threads.

When the primary thread is active, the budget is reallocated to the primary thread. Slack updates are also needed to reflect this. For the killing of "best-effort" threads no adjustments are made to the TimelineSlack$_{i,j}$'s provided they had no guaranteed bandwidth and executed solely on available slack.

The remainder of a thread's unused budget can also be reclaimed for use in this period, if desired. This applies to both hard-deadline and best-effort threads. For hard deadline threads, the reclaimable slack is worst_case_exec_time (thread)—actual_exec_time(thread). For best-effort threads, the reclaimed slack is remaining_slack(thread), which is equal to the slack granted at time of request minus the slack used (or equivalently the execution time) since time of slack request.

Note that we assume the killed thread's budget becomes available for use by others at the start of the next period defined by $T_k$. This is in analogy to the start thread operation.

If the thread being killed/stopped is holding a mutex lock, it is unlocked by this service call. The mutex status now indicates that it was unlocked as the result of a kill/stop thread call.

If the thread being killed/stopped is waiting for an event, it is removed from the linked list for that event. If the thread has no successors and is actively waiting on an event, the unused portion of the thread's budget for this period can be reclaimed.

3.2.6 Wait Until Next Period

The calling thread is suspended until the start of its next period. This procedure can be called by either a thread suspending itself, or by the kernel when a budget is about to expire. If a thread suspends itself, then the call gets charged to the primary thread. But this may have zero budget (if it was stopped). Or in the case of a budget expiration, the kernel would do the detection and initiate the call, hence receive the charge since it initiated the suspension.

Unused compute time in this period can be reclaimed as slack. Just as in many other kernel operations, the reclaimed slack is worst_case_exec_time(thread)—actual_exec_time (thread), where the worst-case execution time of a thread is (in most cases) the thread's budget.

ISR threads may be different, in the sense that they can execute many times per period. If slack is to be reclaimed for ISR threads, then a formal specification of a worst-case execution time is needed (if different than thread budget), and the slack reclaimed is then obtained using the above calculation. Depending on when the slack accumulators are updated, this information may be maintained locally until the aggregate thread updates, or a call to Algorithm 13 (Appendix B) may be made immediately.

3.2.7 Restart Process

All threads, mutexes and events in the process are killed. Only the primary thread is restarted. The primary thread is given its full budget regardless of what it had been at the time of the call.

The slack accumulators need to be updated for all killed threads, and also for the process' primary thread. There are no restrictions on when a process can be restarted. Logically, the TimelineSlack$_{i,j}$'s are adjusted at each thread kill, as discussed in the section on service killThread. Similarly, the TimelineSlack$_{i,j}$ are updated when allocating the primary thread's cpu_time. This sequence of timeline slack variable update operations may be significantly reduced if a new set of timeline variables is simply computed rather than doing repeated updates.

For $k \geq i$, subsequent calculations of TimelineSlack$_{k,\gamma k}$ would be TimelineSlack$_{k,\gamma k+1}$=TimelineSlack$_{k,\gamma k}$+$(T_k - n_{ki} \cdot \text{cpu\_time})$, where the cpu_time is of the actual process's primary thread if the process' primary thread is the only active thread.

For slack maintained at the system level, the process' primary thread needs a constraint vector so that the process utilization budget and the process' primary thread's cpu time are distinguished. The latter is the worst-case amount of execution that the process's primary thread takes, which can vary over time. Initially, the cpu_time might equal the utilization budget when the primary_thread is performing process initializations. Later, it may be reduced to zero or something in between.

3.2.8 Create Mutex

From a scheduling point of view, this does not affect the timeline slack variables but rather is used to determine worst-case blocking times caused by threads executing mutexes. Thus, mutexes can affect the schedulability test results. Mutex blocking times are computed as a system level parameter, not on a per process basis.

The protocol used for mutex access is known as the highest locker protocol, which is a modified version of the well known priority ceiling protocol. The highest locker protocol works as follows. If a thread t wishes to access a mutex M, then when access to M is granted, t (temporarily) inherits the highest (numerically lowest) priority of any thread that has access privileges to M.

max_lock_time is input and defines the maximum time the mutex can be locked per execution by any of the threads that can access it. Also input is priority_ceiling_period, which identifies the period of the thread with the highest (numerically lowest) priority that can access the mutex. If a thread accesses a set of mutexes, say $M_1, M_2, \ldots, M_k$ where $M_j$, is accessed $v_j$ times, then the thread's worst-case execution time has added to it $$\sum_{j=1}^{k} v_j \text{max\_loc\_time}(M_j) \qquad \text{Equation (6)}$$

When computing feasibility analysis, the component of utilization that may be introduced as a blocking time at level priority_ceiling(mutex) is max_lock_time(M)/priority_ceiling_period(M). The feasibility analysis, which includes blocking times at the system level, is provided in Section 3.3.

3.2.9 Lock Mutex

If the mutex is locked, the calling thread is given opportunity to wait until the mutex is unlocked (i.e. the caller can set the wait_okay parameter to true). If the calling thread waits, the time queued while waiting for a lower priority process to execute the mutex counts as blocking time for waiting threads. (Technically, from an implementation point of view, it is a preemption since the lower priority thread executing the mutex had inherited the mutex's priority ceiling, which is at least as great as the waiting thread.) Waiting for higher priority threads to execute is a preemption. Neither preemption times nor blocking times count towards the thread's accumulated execution time; however, both are considered in the feasibility analysis.

All threads (including ISR threads) with user-defined privileges can lock a mutex. For those threads with guaranteed hard deadlines, no checks on slack availability are necessary prior to locking a mutex. For "best-effort" threads sufficient slack must have been allocated to complete the execution of the mutex prior to granting access. This is most easily tested by looking at the residual time slice for execution until the requesting thread will be suspended. If it is smaller than the worst-case execution time for the mutex, the lock will not be granted and the thread (assuming it does not continue an alternative path not requiring access to a mutex) would be wise to suspend itself. However, this policy works only if another service called by a higher priority thread that requires the use of slack is not allowed to begin before the mutex execution is complete.

In DEOS, the thread's residual time slice is first decremented by the worst-case mutex execution time. Then the mutex is executed, and the thread's execution time is decreased when the mutex execution was less than its worst-case execution time. No slack variable updates are needed here.

3.2.10 Reset Mutex

The status of the mutex is set to indicate that it was reset. If the mutex was locked, the lock is released and the locker's execution time is adjusted to reflect the time spent executing the mutex. If the locker reset the mutex, the execution time of this service is added to the locker's execution time. No slack variables are updated during this operation.

3.2.11 Wait for Event

There are three different types of specifiable event waits: indefinite timeout, timed timeout, and immediate timeout, which are described in Algorithms 4–6 (Appendix B), respectively.

If a thread has successors, then either the indefinite or long timeout waits will be passive in the sense that the thread suspends itself after an initial query of an unpulsed event, and then continues to poll the event periodically for either an indefinite (for the indefinite timeout) or at most a prespecified (for the long duration timeout) number of times. All polling, beyond the first, takes place at the beginning of the period. No time is billed against the threads budget when suspended, and in fact the unused compute time can be reclaimed as slack for that period.

If the thread has no successors, then the wait is active for either the indefinite or timed timeout waits. Time spent actively waiting is charged against the thread's CPU budget. The active thread is added to the event's linked list.

If the event is pulsed prior to the budget remaining for the thread's period, it is placed in the ready queue. If the event has not been pulsed prior to the exhaustion of the thread's budget, the thread is complete for period and is suspended until the start of next period. In this case, local slack updates (if the thread is a part of an aggregate) are necessary. The thread has consumed its worst-case execution time so no slack can be reclaimed.

Active waiting resumes at the start of either an indefinite (for an indefinite timeout) or at most a specified (for a timed timeout) number of periods. If while actively waiting, the event is pulsed, the thread is removed from the event's linked list (as are all threads waiting) and placed in the ready queue. No slack updates are required at this time, although the thread's execution time must reflect the time spent actively waiting.

If an event is pulsed between the time a thread suspends itself (either because of a passive wait or an exhausted active wait within a period), the thread is placed directly in the ready queue at the time of next dispatch. Thread execution time and slack variable updates occurred at the time of suspension and are not needed at the time of dispatch.

An immediate timeout has no waiting other than that accounted for by preemption. Thus, a thread with an immediate timeout suspends itself and changes state to CompleteForPeriod if the event is not pulsed when it reaches the head of the ready queue. Slack can be reclaimed at this time.

3.2.12 Pulse Event

Execution of this service removes all threads from the event's linked list and moves them to the ready queue (if there is no other reason why they should remain suspended). At this time the elapsed execution times would be updated for each of the threads that were actively waiting for this event.

3.3 Schedulability Acceptance Test Algorithms in DEOS

In terms of scheduling analysis, DEOS defines quantities in terms of one of two levels: process and system. A process is a set of threads and defines a time partition for all threads in the process. Each process has a utilization bound and, ignoring blocking times, all active threads within a process must be feasible. For periodic processes (or equivalently, non-ISR threads) the worst-case compute time of a thread includes the time it takes to do two context swaps (one at the start and one at the finish) and the time it takes to execute all mutexes accessed (one or more times) by the thread.

Blocking times are maintained at the system level. By pulling blocking times up to the system level, some overall optimizations can be made. This timing optimization may lead to a potential reduction in fault tolerance for hardware failures. In particular, when encountering a recoverable timing or memory fault while executing a monitor shared by multiple processes, it is difficult to argue the error is contained within a single process. It may be the case that all faults are fully non-recoverable.

In the remainder of this section we first describe the per process scheduling feasibility test which ignores blocking times, and then we describe the system level feasibility test which allows for blocking times.

3.3.1 Process Level Schedulability Test

Each process has a set of Constraint vectors, and each vector set contains one vector for every rate. In symbols, $C_p=\{(T_{p,i}, C_{p,i})|i=1, \ldots, n\}$, where n is the number of rates supported by DEOS. $T_{p,i}=T_i$ is the period of the $i^{th}$ rate supported by DEOS, and $C_{p,1}$ refers to the aggregate thread budget in process p. More specifically, if process p has as threads that run at rate i, $t_{p,i,1}, t_{p,i,2}, \ldots, t_{p,i,np,i}$ with worst-case compute times $c_{p,i,1}, c_{p,i,2}, \ldots, c_{p,i,np,i}$ respectively, then $$C_{p,i} = \sum_{j=1}^{n_{p,i}} c_{p,i,j} \qquad \text{Equation (7)}$$

Each process has a PrimaryThread, which is given a period of SystemTickPeriod=$T_1$, the highest rate period, or minimally it runs at a rate not less than any thread in its process. The primary thread is not explicitly declared. Unless the primary thread is stopped, its compute time, or equivalently budget, is determined by all other active threads in the process. Each process p also contains a utilization bound $U_p$.

We now consider a feasibility analysis (ignoring blocking times) for only non-ISR threads. Non-ISR threads are periodic threads that are regularly dispatched and that execute exactly once per period. Let $c_{p,i,j}$ be the budget of thread $t_{p,i,j}$ where the budget should allow for two cswap times and the execution times of all mutexes that $c_{p,i,j}$ might access during any execution. This will produce pessimistic results, but it does allow for worst-case context swap overheads.

Now, for i=1, . . . , n let $$C_{p,i} = \sum_{j=1}^{n_{p,i}} c_{p,i,j} \qquad \text{Equation (8)}$$

Ignoring blocking times, process p is said to be feasible if $$\sum_{k=1}^{n} \frac{C_{p,i}}{T_{p,i}} \leq U_p \qquad \text{Equation (9)}$$

3.3.2 System Level Blocking Test

To assess the impact of the worst-case blocking times on feasibility analysis, some additional notation is needed. Suppose there are m binary semaphores, say $M_1, M_2, \ldots, M_m$ with worst-case compute times $c_1, c_2, \ldots, c_m$, respectively. We further assume that semaphores are not nested even though nested semaphores are allowed in DEOS. Nested semaphores are a straightforward extension.

Let $\tau_i$ be the aggregate thread at level i over all processes. Thus $\tau_{p,i,j}$ is a part of $\tau_i$'s execution for each process p and each rate i's index j. Let $S_i=\{M_j|\tau_i \text{ accesses } M_j \text{ as a part of its execution}\}$. Let $\beta_i$ be the union of all semaphores that can block the execution of $\tau_i$. In symbols, $\beta_i=(\cup_{j>i} S_j) \cap S_i$. Note that $\beta_n=\phi$ (empty set). We can now compute the worst-case blocking time for $\tau_i$ which we denote by $B_i$. $B_i$ is the worst-case execution time of all semaphores that can be executed by any of $\tau_{i+1}, \ldots, \tau_n$ and that are also executed by $\tau_i$. In symbols, $B_i=\max\{c_k|M_k \in \beta_i\}$. Note that $\beta_n=\phi \rightarrow B_n=0$ which we would expect, since there are no lower priority jobs to block $\tau_n$.

Now, for $i \in \{1, \ldots, n\}$ let $U_{Bi}=B_i/T_i$ which is the worst-case level i blocking utilization. Let $U_B=\max(U_{B1}, \ldots, U_{Bn})$. Now let $C_i$ be the worst-case execution time of $\tau_i$, so $$C_i = \Sigma_{p \in P} C_{p,i} \qquad \text{Equation (10)}$$

Finally, the system is feasible if $$\sum_{j=1}^{n} \frac{C_j}{T_j} + U_{B_i} \leq 1 \qquad \text{Equation (11)}$$

or the weaker condition $$\sum_{j=1}^{n} \frac{C_j}{T_j} \leq 1 - U_B \qquad \text{Equation (12)}$$

When there are non-zero phasings and/or non-harmonic task sets, the RMS feasibility test can be more complicated.

3.3.3 Feasibility Analysis for ISR Threads

Feasibility tests for ISR threads in DEOS pose additional challenges since they are not treated strictly as periodics. Every ISR thread does have a period and a (per period) budget. However, an ISR thread may occur as often as it likes in any period, and will receive service as long as it has not exceeded its budget. In theory, there is no restriction on the interarrival times (although the minimum time to latch an interrupt imposes the equivalent of a minimum interarrival time) for ISR threads. The only requirement is that not more than the CPU budget will be given to the sum of all arrivals in a period. For example, if an ISR thread has budget of 10 ms every 40 ms period and each execution takes at most 300 μsec, then about 33≈10/0.3 ISR threads could execute in a 40 ms period.

In other embodiments, the ISR thread need not execute at the priority implicitly defined by its period, but it can execute at up to the highest priority. As a result, the execution of the ISR thread is modeled as a blocking time for higher priority levels and as preemption at lower priority levels. If the ISR thread will execute at priority $P_e$ and is scheduled (via rate) at priority $P_r$, then the ISR thread's execution time will be included as a blocking time for all threads with priority P such that $P_e \leq P < P_r$. In addition, it will be scheduled using the usual feasibility analysis so that preemption times for lower priority threads will be accurately captured.

Let $\alpha_{p,j}$ be an ISR thread with budget $c_{p,j}$ and period $T_j$ and suppose that $\alpha_{p,j}$ will be executed at priority i where $1 \leq i \leq j$. $c_j$ is the budget that includes all context swap times and all critical section compute times in addition to the usual compute time over all executions in a period. For example, if the per dispatch execution time of $\alpha_{p,j}$ is cpu_time, which includes mutex execution time but not context swap time, and $\alpha_{p,j}$ is executed a maximum of k times in any time interval of duration $T_j$, then $k(2\text{cswap\_time}+\text{cpu\_time}) \leq c_j$ if k executions are to be supported within a period of $T_j$.

The feasibility acceptance test for adding an ISR thread differs slightly from the feasibility acceptance test of a periodic thread. First, we modify the blocking times for priorities 1, ..., j−1 as follows: $B'_i = \max(B_i, c_j)$. The blocking times for priorities j, ..., n remain unchanged. In other words, $B_i = B'_i$ for $i \in \{j, ..., n\}$. Let $U'_{Bi} = B'_i/T_i$ and $U'_B = \max(U'_{B1}, ..., U'_{Bn})$.

Now, extending the definition of tasks $\tau_1, \tau_2, ..., \tau_n$ to include ISR threads, the schedule is feasible if for $i \in \{1, ..., n\}$, $$\sum_{j=1}^{i-1} \frac{Cj}{Tj} + \frac{(C_i + B'_i)}{T_i} \leq 1 \qquad \text{Equation (13)}$$

The above can be extended to multiple ISR threads at the same priority and for ISR threads specified at the same priority as periodic threads.

Slack stealing can be used to provide ISR threads with the priority of service they want. The intuitive reason is that an ISR thread that runs at a priority higher than indicated by its rate has been included as a blocking time at the higher rates. The blocking time analysis implies that sufficient slack will be available at those rates, and these should cause no additional overhead.

Aperiodic threads may choose to try and consume slack rather than wait for their priority to become the highest (assuming they are not assigned the highest rate). The reason for using slack is to attempt achieving a more rapid response time. If sufficient slack is available such that the entire ISR thread can run to completion without having to suspend itself, then it can execute. Upon the completion of its execution, the thread may want to give its worst-case execution time (which is 300 μsecs in our example) back to slack so that other threads could consume it. Alternatively, the thread might choose to keep the entire remainder of its budget and potentially sneak in another execution. Slack can be used for either purpose.

3.4 Time-Charging Policies for DEOS Services

In this section, we describe how DEOS charges tasks for overheads incurred. In general, DEOS assigns as much of the overhead time to tasks as is possible. One reason for this objective is to reduce variability in charges accrued by DEOS. For example, thread creation and destruction is a dynamic process, hence variable in the number of occurrences, and thus they are charged to the activating and deactivating threads rather than DEOS. As a rule, the thread incurring the overhead is charged for the time.

A primary and continual source of overhead is context swap times. Each task execution (not each task budget) is charged for two context swap times, one that occurs when the task is started and one when the task completes. If a task is preempted, it is the preempting task that incurs the context swap charges on either end. Note that ISR threads can execute many times per period, and each execution is charged. Presumably the application developer is provided with the time to execute a cswap when estimating compute times, or equivalently when specifying budgets.

Locking, executing, and unlocking mutexes also introduces overheads, some of which are billed to the execution time of the mutex and some of which are billed to the requesting releasing threads. The lock and unlock execution times are billed to the thread attempting to either lock or unlock the mutex. The mutex execution is charged two cswap times, one at initiation and one at completion. These times are included as a part of a mutex's worst-case execution time (note that budget and execution time are not the same for ISR threads).

For each process, there is a PrimaryThread that has a budget. The process has no budget of its own any longer. If the PrimaryThread is active, its budget is defined as all available time not allocated to other threads in the process. If the PrimaryThread is stopped, the remaining process budget is assigned to slack, and the PrimaryThread's budget is zero. Or, the PrimaryThread's budget can be something in between, effectively lowering of the process' utilization bound $U_p$ for an unspecified period of time.

The DEOS monitors execution times and enforces timeouts. The monitoring can be done by simply setting a timer to the worst-case execution time, and if the timer expires, then a timing fault has occurred where DEOS (not the violating thread or monitor) executes the fault handler. There is time to respond to the interrupt that results in additional overrun, and the time-fault handler's execution is charged to DEOS via charging it to the process' PrimaryThread. If the process' PrimaryThread has a budget of zero, this causes problems; however, one could reserve fault-handling capability in that budget.

Every mutex has a monitor process. The monitor process has some time allocation associated with it. When the mutex is locked, the locking time is subtracted from the monitor process time.

3.5 Slack Stealing Scope

There are two logical levels at which available slack can be maintained: the system level and at each of the process levels. We do not consider the possibility of maintaining some slack at the system level and some at the process level. There are some tradeoffs associated with the system versus process level slack scheduling. According to one embodiment, system level slack scheduling is supported, so we begin with the advantages of system level slack availability. Then we list some potential disadvantages. It is not difficult to transform the advantages of system level slack to the disadvantages of process level slack, and similarly, the disadvantages of system level slack into the advantages of process level slack.

Some advantages of system level slack are given below:
Slack sharing can occur among processes and is not confined to a single process. Both reclaimed and timeline slack can be shared among processes, allowing a thread in high need of bandwidth to make use of all available slack in the DEOS system.
A reduced implementation code is likely. There is only a single set of slack variables to specify. Specifically, there is a single timeline slack vector, and a single set of idle and activity time accumulators. This saves some amount of space, but unless the slack variables are passed as parameters (which incurs run-time overhead), it also saves replicate code for the slack update operations.

Some disadvantages of system level slack are given below. Most of the disadvantages are categorized as potential, and their potential or lack thereof may become more clear when detailed algorithms are generated. Certain disadvantages that DEOS specifically side-steps may be of concern in other implementations.
Potentially it will take longer to execute operations requiring system level slack updates than process level slack updates. This follows from the fact that a system level aggregate thread will tend to contain many more component threads than a process level aggregate thread. If thread completion updates are done incrementally (with only a single update upon completion of the aggregate) then this may not be relevant.

Interprocess verification may be more difficult. This may depend on DEOS observation capabilities to a large extent and may not be of concern.

There may be potentially less fault containment within a partition. Under fault conditions, system level slack variables may lead to error propagation. Analysis of the set of all possible hardware faults and mechanisms for possible error detection and recovery and their effects is needed to determine whether system level slack variables can lead to recoverable and otherwise containable process errors. See also Section 3.3.2 on blocking times.

3.6 Other Considerations for Slack Scheduling

This section lists other considerations to support slack scheduling. In particular, some DEOS services (not previously mentioned) that are likely to affect the values of slack variable are listed.

(1) System Powerup/Restarts can occur at any time.

For system powerup, some synchronization and initialization takes place in DEOS. The timeline slack variables are initialized based on the budget of a process' utilization being assigned to the process' PrimaryThread. Slack activity and idle accumulators are initialized to zero. Algorithms for slack initialization at system powerup are defined in Section 4 entitled Slack Scheduling in DEOS With Dynamic Threads.

For system restart in response to a transient powerdown, the "clock" could resume at the start of the most recently recorded highest rate period. For example, if the highest rate period is $T_1$, then if somewhere between $k\,T_1$ and $(k+1)T_1$ a power failure is detected, the time of restart would be "declared" to be $k\,T_1$.

There are three slack variables, one for each slack level, that have to be considered.

Then there are the level i activity (AperiodicTime$_i$) and the level i inactivity (Idle$_i$) variables that are updated whenever an aggregate thread completes.

(2) Process Restarts can occur at any time. Technically this was covered under thread start and stop although it is worth repeating here since process restarts are often thought of as a response to abnormal situations. If a process restart is executed, and the PrimaryThread is active, then all other threads in the process are stopped/killed, and their budget goes back to the PrimaryThread. When the PrimaryThread is stopped, it is started. In both cases, timeline slack variables are decreased for killed/stopped threads, and they are increased for the PrimaryThread.

(3) Process Creation and Destruction can occur at any time. In terms of slack computations, it seems as if initially the new process' PrimaryThread would be the only active thread, so this would appear to be a start thread call in terms of adjusting the slack variables. However, a sort of system feasibility test needs also to be called, since the newly created process cannot have a utilization bound that would result in system unfeasibility.

Section 4—Slack Scheduling in DEOS with Dynamic Threads

The present invention relates to a slack scheduling implementation in a real-time operating system (RTOS) employing dynamic threads of execution that has application, for example, in controlling an aeronautical system such as an aircraft or spacecraft. In one embodiment, the invention forms part of a real-time operating system used in an aeronautical control system developed by Honeywell, Inc., Minneapolis, Minn., which is known as Digital Engine Operating System (DEOS). However, the invention is not limited to implementation in DEOS or in a RTOS, and it can be utilized in any type of data processing system, although it has particular utility in a real-time control system, such as an industrial, residential, commercial, military, or other type of control system.

When a real-time control system contains dynamic threads, as opposed to a fixed set of tasks, it requires a more general and more complex set of algorithms to implement a robust slack-stealing capability. The present description provides reasonably detailed pseudo-code algorithms for implementing slack scheduling in a RTOS having dynamic threads. No attempts have been made to optimize these algorithms, since optimizations are highly system-dependent.

Section 4 is organized as follows:

Section 4.1 describes the impacts on slack calculations resulting from the differences in assumptions between "active task sets" in DEOS and in a classical RMS system. Due to the dynamism, assumptions about "future" idle time availability essentially disappear, and slack availability updates become much more frequent at all slack levels (specifically, at the highest rate of any primary thread in the system).

Section 4.2 describes "timeline slack" in the context of dynamic threads and process activations and deactivations, and how to compute it. The algorithms that maintain, track, and update the thread and process budgets used for time partitioning in real-time operating systems with dynamic threads and process (de)activations define critical quantities used when calculating accurate values for available (dynamic) timeline slack.

Section 4.3 provides algorithms for keeping track of reclaimed slack availability and all slack consumption using slack accumulators. As discussed earlier, reclaimed slack is any time "given up" from a worst-case budget by completing for period early.

Section 4.4 describes two different approaches for slack allocation. The differences lie in deferring slack availability calculations for slow rate slack consumers when higher rate slack consumers subsequently become present.

For convenience, a large table of notation is found in Table 8. Much of the notation in Table 8 will have been previously defined in context.

Section 4.1 DEOS Scheduling Assumptions

Four properties of DEOS require that slack stealing as previously known be modified:

1. Dynamic "period timeline" slack resulting from dynamic thread activations and deactivations (i.e. the "timeline slack" is dynamically varying, unlike in known systems supporting slack stealing, and DEOS' only sources of "timeline" slack are the budgets of inactive primary threads, unallocated system level slack, and possibly reclaimed slack from application threads that CompleteForPeriod almost immediately);

2. Aggregate threads, or equivalently, many threads that run at the same rate with explicitly disallowed priority ordering among them (this leads to choices of times for reclaiming slack from unused worst-case execution time);

3. Slack sharing among processes and budget sharing among threads within a process (primary thread activation and deactivation when pending user thread activation and deactivation requests exist mean that slack reclamation values need to be modified); and lastly 4. Fault tolerance for recovery from processor/process/thread restarts, transient failures, and time synchronization while supporting slack stealing.

Some of the system level notation used in this Section 4 is found in Table 7 (Periodic Thread Notation) (Appendix A). Table 8 (Slack Scheduling Notation) (Appendix A) contains a list of the more frequently used notation.

So as not to continually have to specify whether a thread is static or dynamic, we refer to "thread activation" for creating a dynamic thread and for starting a static thread. Similarly, we use "thread deactivation" to mean killing a dynamic thread or stopping a static thread. The create/start and kill/stop use should be clear from the context of the thread type (dynamic/static). This same terminology applies to processes as well as threads.

There are basically four classes of algorithms associated with slack scheduling:

1. Slack variable initialization and hyperperiod reset routines initialize and periodically reset the slack variables. These routines are described in Sections 4.2.2 and 4.2.3. When allowing dynamic allocation of threads, the period resets are more complex than in the case where only static threads are present.

2. When requests for either user thread or process (de)activations occur, changed quantities in the primary thread's budget need to be recorded so that they can be incorporated in the recalculation of period timeline (when the primary thread is inactive) at the appropriate period resets. These calculations are described in Section 4.2.4–4.4.6.

3. Slack variable accumulator update routines are executed in response to one of several events listed in Section 4.3. Slack variables in this category keep track of reclaimed slack, idle time consumed, and slack time consumed.

4. Slack availability calculations must be made whenever a thread (implicitly) requests slack. This algorithm is given in Section 4.4. The algorithm for computing slack availability might be based on different sets of slack accumulator values, depending on the policy chosen.

Section 4.2 Dynamic Timeline Slack

Ignoring for the moment system utilization reserved for blocking times, all static timeline slack is assumed to be zero in DEOS, because threads and/or processes can be activated potentially resulting in 100% system utilization. Consequently, we make no assumptions about timeline slack availability in the future, and parcel out dynamic (period) timeline slack in little increments at the rate of the primary thread as they become available.

It is not uncommon for processors to have a worst-case utilization not far from 100% (and sometimes more), so the assumption of only reclaimed slack is applicable in practice. Currently, DEOS' estimated worst-case utilization is about 88%. It also admits a slack model that supports randomly occurring activation and deactivation requests effective next period for threads and processes. It does not effectively support design to time tasks, and it will be less effective (but not necessarily ineffective) at supporting incremental tasks since available slack produced by the higher rate threads is not available to threads at the lower rate, a priori (at least not a priori one short period).

At least two sources of period timeline slack are (i) system time not allocated to processes and (ii) primary thread budgets when declared inactive (i.e. the sum over the $\zeta_k$'s in Z). In one embodiment, these two sources occur at level 1, and are made available at times $jT_1$, $j \in \{0, 1, 2, \ldots\}$. These definitions extend easily to processes with primary threads at slower rates than $T_1$. Many of those details are included in the algorithms presented herein.

A possible third source might be ISR and periodic threads that CompleteForPeriod nearly immediately (e.g. when polling for a resource and not getting it). Since there is no way of knowing how soon a thread will complete for period, the implementation will likely be simpler if no special attempts are made to reclaim user thread slack at the start of each period. Just as hyperperiod timeline slack persists only through the hyperperiod in the original model, period timeline slack is guaranteed to persist at the level at which it was allocated only to the next period. However, under certain conditions we will see that it is possible to carry forward period timeline slack.

Note that the notion of period timeline slack is largely a conceptual model and can be implemented using the slack reclamation mechanism. By explicitly reclaiming it early in the period, it helps to allow the slack stealer to respond rapidly to applications, especially for high rate aperiodic interrupt slack requests such as TCP/IP requests. It also provides an explicit handle for easier measurement of period timeline slack availability which can facilitate both testing and analysis for "fairness" designs among different applications.

Several data structures are used to keep track of utilizations, both current and future Wending granted activation/deactivation requests). Table 9 (Process Record Attributes—Budget Update Vector) (Appendix A) describes a Budget Update Vector that is maintained for each process. The budget update vectors keep track of the future (projected) UserBudget of each process. The actual values of the updates of timeline slack are deferred until the times at which the thread (de)activations become effective (by using ΔTimelineSlack).

Adopting notation similar to that originally proposed, TimelineSlack$_i$=TimelineSlack$_i$ (t) is used to denote the amount of period timeline slack that has been made available to (only) level i slack requesters since the start of the last period defined by $T_i$. It is important to note that the value of TimelineSlack$_1$ is not cumulative since the start of the hyperperiod and applies only to slack produced at rate i, both of which are departures from the original definition. These definitions are summarized in Table 8.

In addition, the system maintains a utilization change vector, ΔUsys and a system utilization value, Usys. These quantities are shown in the bottom of Table 9 (Process Record Attributes—Budget Update Vector). Like a process' UserBudget, the value of Usys is the system utilization if no further processes are (de)activated and all currently pending requests are allowed to transpire. The current system utilization allocated to processes can be constructed from the pending changes in utilization at level i, stored in ΔUSys(i). These constructions are important for feasibility tests, discussed below.

In one embodiment, it will be the case that TimelineSlack$_1$=0 for $i \in \{2, \ldots, n\}$, since all primary threads have rate 1. Similarly, ΔUsys is a single value since all primary threads all have the same rate. In other embodiments, provision may be required for different processes having their primary threads declared at different rates. The algorithms presented herein support this. Some embodiments may also require support for partitioning of slack among applications (perhaps for better fairness guarantees). This would require introducing a process index to many of the slack data structures.

The algorithms that can lead to an update in the value of TimelineSlack$_1$ are requests for user thread (de)activation (Algorithm 10), primary thread (de)activation (Algorithm 9), and process (de)activation (Algorithm 11). Discussion of each of these algorithms follows in subsequent sections.

The practical storage needed to maintain period timeline slack table and aggregate compute time information is $O(n^2)$ when all tasks are harmonic. Specifically, $O(n^2)$ storage is required to store the $(n_{ij})$ matrix and also the matrix ($\Delta$TimelineSlack$_{i,j}$) that keeps track of the change to occur in timeline slack at level i when start of periods $T_j$ and $T_1$ next coincide, $j \geq i$. Several additional n vectors are used. Each process must keep track of pending changes in each budget rate, which is an $O(n)$ data structure per process. This is shown in Table 9. In one embodiment, $\Delta$TimelineSlack can be represented as an n-vector, since all processes' primary threads have period $T_1$.

It is necessary to defer timeline slack updates to the appropriate period boundary to ensure that budgets are available for currently executing threads to complete (in the case of deactivation) and that excessive budgets are not made available too early (in the case of future activations) so as to not jeopardize existing threads (which may "simultaneously" deactivate allowing others to activate).

Figure 12:
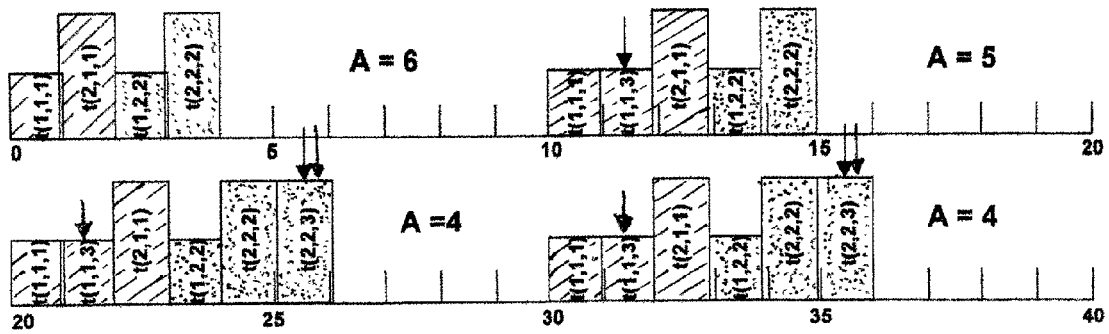
FIG. 12 is a task execution timeline illustrating a conceptual model for dynamic thread activations.

FIG. 12 is a task execution timeline illustrating a conceptual model for dynamic thread activations. FIG. 12 represents a theorized time scheduling model in a system employing time partitioning. There are no slack requests from aperiodic tasks in FIG. 12.

In the initial configuration, there are two partitions $P_1$ and $P_2$, each having 5 ms budgets and inactive primary threads. Partition $P_1$ is depicted by low blocks in FIG. 12, and partition $P_2$ is depicted by medium blocks. Each partition has two rates $R_1$ and $R_2$. Rate $R_1$ is represented by cross-hatching; rate $R_2$ is represented by stipling. Rate $R_1$ has a period=10 ms; rate $R_2$ has a period=20 ms. It is assumed that primary threads execute at the highest rate, which is always true in a DEOS embodiment.

In FIG. 12 each thread is identified by a data structure of the form t(P, R, T), wherein "P" is a partition id, "R" is a rate id, and "T" is a thread id.

The worst-case execution time for thread 1 of partition $P_1$ is C(P1, R1, T1)=1 ms. The worst-case execution time for thread 2 of partition $P_1$ is C(P1, R2, T2)=2 ms.

The worst-case execution time for thread 1 of partition $P_2$ is C(P2, R1, T1)=1 ms. The worst-case execution time for thread 2 of partition $P_2$ is C(P2, R2, T2)=2 ms.

At time t=2, an $R_1$ thread is activated (thread 3) in partition $P_1$. Thread 3 of partition $P_1$ is effective at t=10 ms, i.e. at its next period, and it remains active until deactivated (not shown). The worst-case execution time for thread 3 of partition $P_1$ is C(P1, R1, T3)=1 ms. Thread 3 of partition $P_1$ is thus allocated 1 ms every 10 ms by the scheduler. The single down arrows in FIG. 12 indicate the times when thread 3 of partition $P_1$ is executed.

At time t=6, an $R_2$ thread is activated (thread 3) in partition $P_2$. Thread 3 of partition $P_2$ is effective at t=20 ms, i.e. at its next period, and it remains active until deactivated (not shown). The worst-case execution time for thread 3 of partition $P_1$ is C(P2, R2, T3)=2 ms. Thread 3 of partition $P_2$ is thus allocated 2 ms every 20 ms by the scheduler. The double down arrows in FIG. 12 indicate the times when thread 3 of partition $P_2$ is executed.

Timeline slack (A) is available in FIG. 12, as illustrated by A=6 between times 4 and 10; A=5 between times 15 and 20; A=4 between times 26 and 30; and A=4 between times 36 and 40.

However, no reclaimed slack is available in FIG. 12, because each thread is taking its worst-case execution time.

Figure 13:
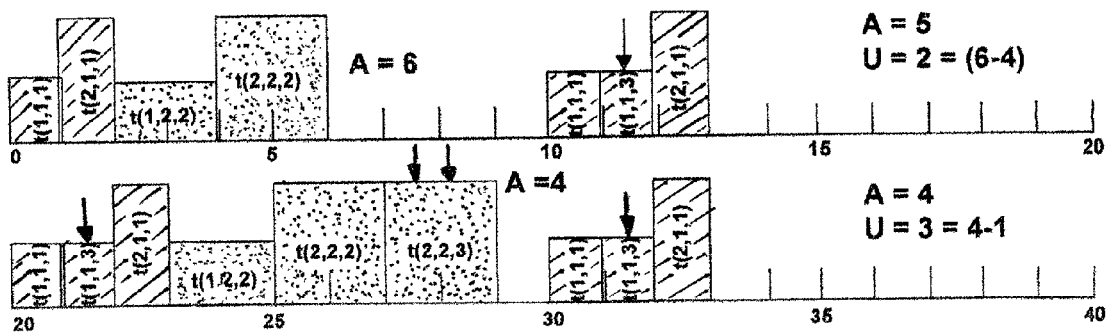
FIG. 13 is a task execution timeline illustrating an observed thread activation with no slack requests.

FIG. 13 is a task execution timeline illustrating an observed thread activation with no slack requests. FIG. 13 represents an actual timeline with no slack requests from aperiodic tasks. Threads are executed with priority by rate, so long as a partition's time budget has not expired. It will be observed that the actual timeline of FIG. 13 differs from the conceptual model of FIG. 12, in that in FIG. 12 tasks are distributed fairly uniformly throughout the hyperperiod, whereas in FIG. 13 the highest priority task that is ready executes first. The conceptual model of timeline slack of FIG. 12 cannot make assumptions about the future, and so it must assume that tasks are uniformly distributed throughout the hyperperiod; however, when a task is ready, it will run, so the observed timeline in FIG. 13 differs from the conceptual model of timeline slack of FIG. 12.

Just as in FIG. 12, a thread 3 of partition $P_1$ is activated at time t=2, and it becomes effective at time t=10. Likewise, a thread 3 of partition $P_2$ is activated at time t=6, and it becomes effective at time t=20.

The single down arrows in FIG. 13 indicate the times when thread 3 of partition $P_1$ is executed. It will be observed that thread (1,2,2) executes in 2 consecutive time units (i.e., between time 2 and 4, and between time 23 and 25) in FIG. 13, whereas this thread executed in four separate one-unit intervals in FIG. 12.

The double down arrows in FIG. 13 indicate the times when thread 3 of partition $P_2$ is executed. It will be observed that thread (2,2,2) executes in 2 consecutive time units (i.e., between time 4 and 6, and between time 25 and 27) in FIG. 13, whereas this thread executed in two separate two-unit intervals in FIG. 12.

Also, thread (2,2,3) executes in 2 consecutive time units (i.e., between time 27 and 29) in FIG. 13, whereas this thread executed in two separate one-unit intervals in FIG. 12.

The amounts of available slack A and unused slack U are indicated above the timeline.

Figure 14:
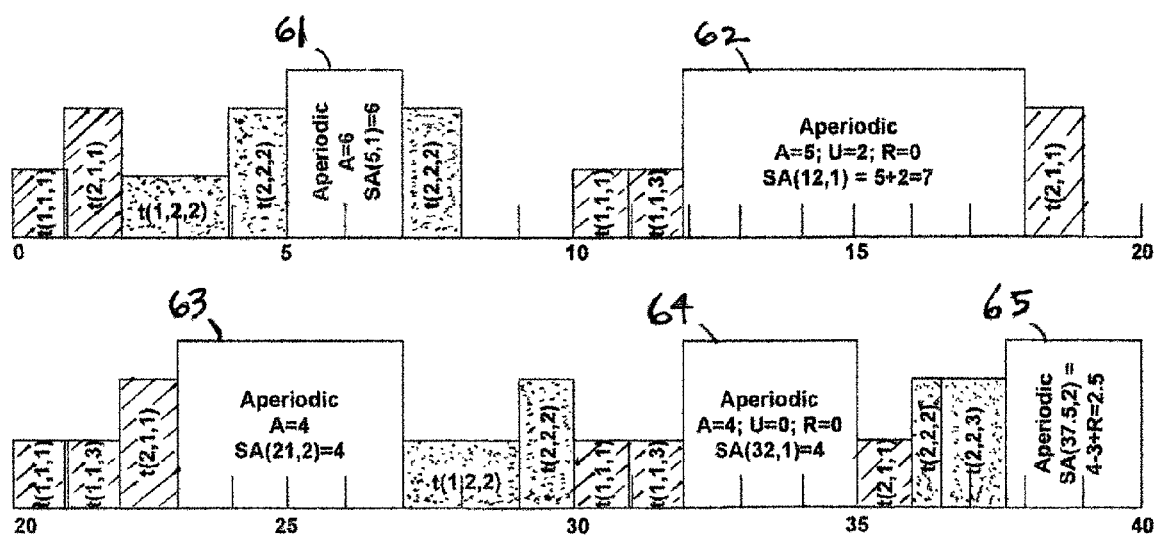
FIG. 14 is a task execution timeline illustrating a thread activation with slack requests, in accordance with an embodiment of the invention.

FIG. 14 is a task execution timeline illustrating a thread activation with slack requests, in accordance with an embodiment of the invention. The aperiodic slack requests are depicted by boxes 61–65 in FIG. 14.

Just as in FIGS. 12 and 13, a thread 3 of partition $P_1$ is activated at time t=2, and it becomes effective at time t=10. Likewise, a thread 3 of partition $P_2$ is activated at time t=6, and it becomes effective at time t=20.

In addition, in FIG. 14 the following slack requests of aperiodic tasks are serviced:

a slack request 61 at time t=5 for 2 ms of time at priority 1, denoted by the expression SA(5,1).

a slack request 62 at time t=12 for 6 ms of time at priority 1, denoted by SA(12,1).

a slack request 63 at time t=21 for 4 ms of time at priority 2 (it begins at t=23), denoted by SA(21,2).

a slack request 64 at time t=32 for 3 ms of time at priority 1, denoted by SA(32,1).

a slack request 65 at time t=37.5 for 2.5 ms of time at priority 2, denoted by SA(37.5,2).

Also contained within the aperiodic boxes is information concerning the available slack, unused slack, reclaimed slack, and slack requested.

4.2.1 Preservation of Time Partitioning in DEOS

Time partitioning is important in providing time fault management. No thread in one partition $P_1$ can cause a time fault in another partition $P_2$. Instead, the time fault is contained within $P_1$.

Time partitioning also provides reduced certification time and cost. Partitions are classified by "criticality". A highly critical partition is more costly to certify. With time partitioning, changes to tasks in a lower criticality partition do not require recertification of the higher criticality partition.

In DEOS, there are two types of "budget" sharing that can take place. It is important to understand that budget sharing via slack does not violate time partitioning in any way.

First, when the primary thread is active (at level h), budgets are shared within a process in the sense that budgets for newly activated threads (say, at level i≧h) must come from the primary thread's budget, and budgets for recently deactivated threads are returned to the primary thread's budget. When the primary thread of process P is active, system slack for P comes only from user threads that complete for period having consumed less than their worst-case execution time. Thus slack is never used for thread activation, since its lifetime is limited to the period in which it was reclaimed.

Second, when the primary thread is inactive, any surplus budget not allocated to user threads for that process is essentially allocated to a common system level slack pool (in one embodiment). It is allocated every period $T_h$, where $T_h$ is the period of the highest rate thread declared in the process (for one embodiment $T_h = T_1$ for all processes). The primary thread will also have rate $T_h$. This is slack in addition to slack available from user threads. We will see that even when the primary thread is inactive, the process still has access to the remainder of its utilization (held in system level slack) that can be reclaimed for (user and primary) thread activations and deactivations in a timely manner.

Third, pooling of reclaimed slack at a system level might initially raise questions about whether time partitioning is preserved. It is not difficult to see that time partitioning is preserved when (i) a process' utilization is still used to determine feasibility of thread activations belonging to that process and (ii) slack is not preallocated beyond the next period for which it might be consumed by a thread activation.

In the absence of hardware timing faults, it is not difficult to see that time partitioning among all active processes is preserved. Specifically, the admission decision to activate a thread t into a process P is based solely on the availability of the P's primary budget. Whether P's primary budget is active or inactive, the same feasibility test is used for user threads. The requests to activate/deactivate a process' primary thread is again based on the same feasibility test, except the amount of budget (de)allocated (from) to the primary thread is all remaining budget not already allocated to active threads in P.

Thus a thread t in process P cannot be activated unless there is sufficient budget in P's primary thread, whether the primary thread is active or inactive. Clearly when P's primary thread is active, none of P's "activation budget" is allocated to the system slack pool, so activation of t is subject only to feasibility conditions and does not violate time partitioning.

Now suppose that P's primary thread is inactive, and t requests a level j activation at time s. Suppose also that the request for t's activation has been deemed feasible. P's primary thread's rate is h, h≦j. We must show that at time $(\gamma_j(s)+1)T_j$ that $TimelineSlack_h$ will have been decreased by $\delta_j/j_{j_h}$ and also that the amount of slack made available beginning at time s will be decreased to all level k∈{h, ..., n} slack consumers. This follows from the decrement of $\Delta TimelineSlack_{h,j}$ by an amount $-\delta_j/n_{j_{j_h}}$, and consequently beginning at time s, $TimelineSlack_h$ is decreased by $\Delta TimelineSlack_{h,j}$.

A simple calculation shows that the amount of period reclaimed slack in any period defined by $T_k$, k∈{h, ..., j}, beginning not sooner than $(\gamma_j(s)+1)T_j$ will be reduced by $(n_{k/h} \delta_j)/n_{j/h}$. Note that the reductions in slack availability occur at the start of periods of $T_h$ by an amount $\delta_j/n_{j/h}$. The reduction is not made all at once for each period level. Thus time partitioning is preserved in DEOS when using slack scheduling.

One can then view the DEOS "system" as a process with a budget, and each process as a thread. Feasibility for a new process is then based on the amount of unallocated bandwidth at the system level, and the same budget transfer mechanism is used to transfer system budget to a new process as is used to transfer a process' budget to a new thread. An exactly analogous argument can be used to show time partitioning is preserved in the presence of process creations/deletions as well.

By providing a common "slack pool" for all tasks, independent of task partition, the present invention achieves significant advantages of both slack-stealing and time partitioning.

For example, the present invention enables the execution of non-critical functions that would otherwise be infeasible, such as debugging, monitoring, networking, and so forth, and/or it enables the enhancement of essential tasks, such as increasing display rates.

In addition, the present invention supports more robust time fault management. Time faults in one partition might be recoverable if slack has been reclaimed from another time partition.

Figure 15:
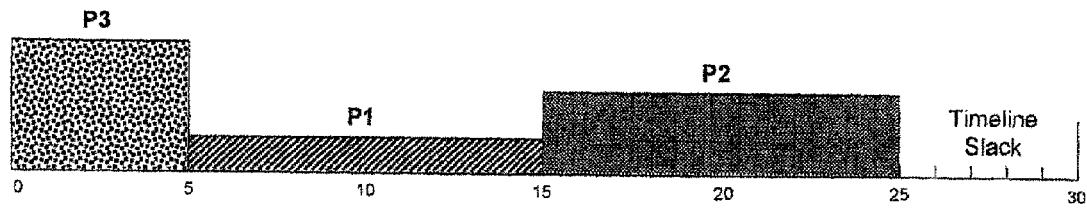
FIG. 15 is a task execution timeline illustrating task execution without slack stealing.

FIG. 15 is a task execution timeline illustrating task execution without slack stealing. Partitions $P_1$ and $P_2$ are defined as critical. Partition $P_3$ is non-essential. $P_1$ uses 10 ms of time; $P_2$ uses 10 ms; and $P_3$ uses a minimum of 5 ms and a maximum of 20 ms. The hyperperiod is 30 ms. 5 ms of time is unallocated timeline slack and can only be used by any background task, absent the use of a common slack pool for use by all tasks, independent of task partition. FIG. 15 illustrates that without pooled slack stealing, only background tasks can share unclaimed slack.

Figure 16:
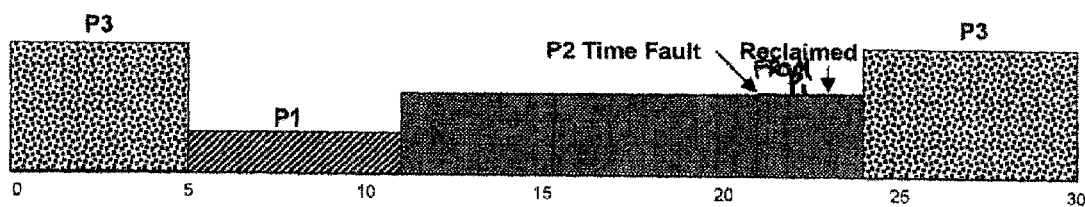
FIG. 16 is a task execution timeline illustrating task execution using both reclaimed and timeline slack.

FIG. 16 is a task execution timeline illustrating task execution using both reclaimed and timeline slack. In FIG. 16 it is assumed that a common slack pool is provided for use by all tasks, independent of task partition. Partitions $P_1$ through $P_3$ are as described above for FIG. 15.

However, in FIG. 16, $P_1$ completes 4 ms early. $P_2$ begins 4 ms early and overruns at time 21, using reclaimed slack from the slack pool that was released by $P_1$. $P_3$ uses unallocated timeline slack from the slack pool.

FIG. 16 illustrates an example of fault recovery through the use of slack stealing from a common pool that is available for all tasks, independent of task partition.

Figure 17:
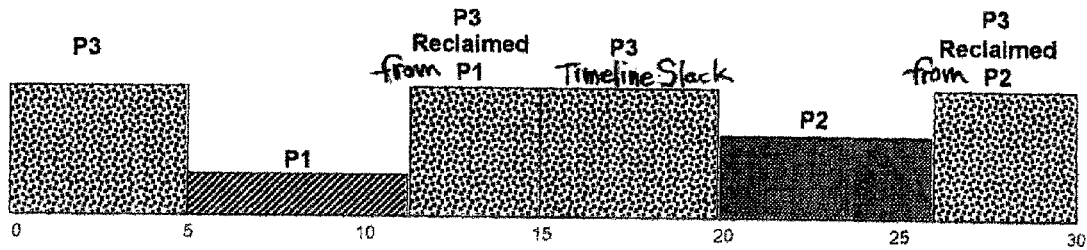
FIG. 17 is a task execution timeline illustrating task execution using reclaimed slack.

FIG. 17 is a task execution timeline illustrating task execution using reclaimed slack. In FIG. 17 it is assumed that a common slack pool is provided for use by all tasks, independent of task partition. Partitions $P_1$ through $P_3$ are as described above for FIG. 15.

In FIG. 17, $P_1$ completes 4 ms early. Beginning at time t=11, $P_3$ uses reclaimed slack (released by $P_1$) from the slack pool and executes until t=15. Then at t=15, $P_3$ uses timeline slack, executing until t=20. $P_2$ executes beginning at t=20 but finishes early at t=26, at which time $P_3$ again executes, using reclaimed slack from $P_2$ until t=30.

FIG. 17 demonstrates how a high priority, but non-essential partition such as P3 can use both timeline slack and reclaimed slack from a common pool of slack.

Rather than maintain a slack pool that is independent of time partitions, the present invention could be implemented by maintaining a slack pool for each time partition.

4.2.2 Initializations

Upon system boot, certain slack variables must be initialized. These are shown in Algorithm 7 (Appendix B), and the initializations must occur before executing the "first" hyperperiod. The data structures are all defined in Tables 6 and 7 (Appendix A). Extensions of this algorithm are necessary when primary threads can have periods other than $T_1$.

Pseudo-code for handling system initialization of slack variables is provided by Algorithm 7 (Appendix B). Algorithm 7 is called once before the start of the initial hyperperiod. Failure to initialize slack variables at this time will result in bogus values later. This algorithm requires modifications when primary thread periods can be other than $T_1$.

4.2.3 Period Resets of Slack Variables

At period resets, many of the slack accumulators' values must reset, and timeline slack values may need updating. Even when threads have not been (de)activated, period resets are still necessary to increment the period indices (i.e. the $\gamma_i$'s) and reset the aggregate completion indicators, A level k period reset is performed at times $j \cdot T_k$, where j is any natural number.

The pseudo-code for providing these functions is given by Algorithm 8 (Appendix B). Algorithm 8 must be called initially (after executing the system initialization code) with the value j=n, to initialize accumulator values at the start of hyperperiod. This algorithm is called at the start of every period, that is, at times $0, T_j, 2T_j, \ldots$, etc. This algorithm is called once at the largest period. That is, the start of a period for $T_j$ is also the start of a period for $T_k$ when $k \leq j$. "r" indexes the rates at which primary periods are supported. In one embodiment, r=1, always, so this is an O(n) routine. When thread (de)activations occur, update changes in dynamic period timeline slack. Process sets with indices may have to be introduced for their primary threads.

The inner loop setting $\Delta TimelineSlack_i$ is a no-op when no activations or deactivations have occurred at level k in the last period of duration $T_k$, $1 \leq k \leq j$ prior to execution of this routine. An optimization might be to keep a Boolean vector, say $\alpha = (\alpha_1, \ldots, \alpha_n)$ where $\alpha_k$ is TRUE only if de/activations at level k have occurred.

Since $T_k$ evenly divides $T_1$ for k<i, the periodic update needs only be called once by the slowest rate, at which time all updates for higher rate threads are made. This is probably more efficient that making i distinct calls.

4.2.4 Primary Thread Activations and Deactivations

Pseudo-code for primary thread activations and deactivations are provided in Algorithm 9 (Appendix B). If P. active, then deactivate P's primary thread; else activate P's primary thread. (De)activation request "processing" time is at s, where $\gamma_r T_r \leq s \leq (\gamma_r+1)T_r$, with r=P.rate.

In terms of adjusting for timeline slack availability, a deactivation of a process with no user threads is equivalent to killing a process. Similarly, an activation of a primary thread budget with no user threads is equivalent to creating a process in terms of changes in timeline slack. A true process create/delete requires updating the registry and status of the processes and doing a feasibility analysis, whereas a (de)activation request for a primary thread is always granted on the basis of feasibility.

We implicitly assume that a call to Algorithm 9 is to toggle the activation status. In practice, an explicit request would likely occur, so a check for a no-op would be present initially.

Some observations about the PrimaryThread(De)activation algorithms are worth noting. The process record attributes are contained in Table 9. We assume that CurID(j) and P.ReqID(j) uniquely identify the period defined by $T_j$. It is not sufficient to use $\gamma_j$, since the only times at which P.ReqID and P.ΔBudget are zeroed out is when (user or primary) threads are (de)activated. In particular, they are not zeroed out periodically. The reason for not zeroing them out periodically (such as at the hyperperiod) is because we do not want to introduce an O(p) operation, where p is the number of active processes, since this number is non-deterministic in DEOS.

The test CurID(j)>P.ReqID(j) should really be modified to read CurID(j)>P.ReqID(j) or P.ReqID(j)−CurID(j)>~c, where c is any constant $\geq n_{n|1}$. The second part of the test takes into account counter roll over. There is a 1 in $2^{32}$ chance that without this test, CurID(j) and P.ReqID(j) would coincide erroneously. This would result in a permanent error, because an erroneous request for an activation would "permanently" leave the system underutilized (if granted) and an erroneous request for deactivation could result in over-subscription, since the system would believe it had lower utilization than it actually did.

In one embodiment, the time to deactivate a thread is not bounded, but in other embodiments it is. In the above-described embodiment, we have assumed that a thread deactivation request becomes effective at the next period the thread would have run.

4.2.5 User Thread Activations and Deactivations

Pseudo-code to update process records and system timeline changes in response to requests for user thread activations and deactivations is provided by Algorithm 10 (Appendix B). Algorithm 10 is executed at the time the activation/deactivation is being processed/granted, and not at the next $T_j$ period boundary. It is at the next $T_j$ period boundary that reclaimed timeline slack is updated.

It is important to note that feasibility tests are based on the set of tasks defined by the order in which activation and/or deactivation requests occur. This order may differ from the order in which the activations and deactivations will become effective. Under unusual circumstances, the set of threads for which activation and deactivation requests are granted (but not made) might differ from the set of threads for which they actually occur. For example, a request to activate t at rate j immediately followed by a request to deactivate t results in no change in the set of active threads, provided both requests are made in the same period defined by $T_j$.

The on-line admission test for feasibility of thread activations (see Section 3.3) might have been called previously, in which case a second acceptance test is unnecessary. If P's primary thread is active, then no budget updates will be made in the timeline slack available unless P's primary thread status is later changed from active to not active. If this happens, the amount of user budget held by P at the primary thread (de)activation request can be constructed using P.ReqID and P.ΔBudgetReq. These reconstructions are shown in the UserThread(De)activation algorithm (Algorithm 10).

We assume that both activations and deactivations become effective at the next start of period $T_j$, where j defines the rate of the thread being (de)activated. Thread deactivation is not conditional on the basis of feasibility. A thread in an inappropriate state may not be deactivated, but that is not a scheduling issue and so is not discussed here. We assume the thread's state is suitable for deactivation by the time the UserThread(De)Activation code is called.

If among all processes, only $n_0 \leq n$ of the rates are used by the processes' primary threads, then the dimensions of TimelineSlack is 1-by-$n_0$ and the dimension of ΔTimelineSlack is $n_0$-by-n. In one embodiment, $n_0 = 1$, so TimelineSlack is a scalar value, and ΔTimelineSlack is a row vector of length n. In other embodiments, primary threads could have a rate other than 1.

4.2.6 Process Activations and Deactivations

A process activation refers to a process creation, not a primary thread activation. A newly created process has no active user thread, and we assume the primary thread is active. (An inactive primary thread is actually a simpler case.)

Similarly, a process deactivation refers to a process deletion, not a primary thread deactivation. A process cannot be deleted if any of its user threads are active. If the primary thread is active, it is first deactivated by calling PrimaryThread(De)activation.

Note that processes can be truly dynamic in DEOS, and they need not have been declared (with not ProcActive status). The algorithm currently assumes that all processes exist, some of which are active (P.ProcActive) and some of which are not. The extensions for first checking if a process exists and, if not, creating it are straightforward.

From a slack perspective, we assume that when a process is created, all of its budget belongs to the primary thread and the primary thread is active. When a process is deleted, and its primary thread is inactive, the only accounting that takes place is an update to the set of active processes (there is no change in slack availability). For process deletion when the primary thread is active, the reserved process utilization is converted to timeline slack.

The pseudo-code for these operations appears as Algorithm 11 (Appendix B). Algorithm 11 calls Algorithm 9 to make any necessary transfer of budgets. We have assumed that a process create/delete takes place at the next period boundary defined by $(\gamma_r(t)+1)T_r$, where t is the time of request, and r is the process' rate, P.Rate. Assume that t is the time DEOS decides to make the variable updates for the pending request.

4.3 Slack Accumulator Updates

In DEOS, there is a relatively small (e.g. 4 or 5) number of rates at which applications can be run. Each process will likely have many (perhaps dozens of) threads that run at the same rate. We call the collection of all threads running at rate i an aggregate thread, which we have been denoting, by $\tau_i$. Note that an aggregate thread is defined independently of processes. One could, if desired, decompose aggregate threads into aggregate threads within processes, but this is not necessary if all slack is pooled at the system level. The original definition of slack stealing assigns each thread a distinct priority (where threads with equal rates have an explicit and static priority ordering among them).

In this section, we look at slack update times. There are several different accumulators that keep track of slack, which are defined in Table 8, if not previously defined.

In general, certain sets of slack accumulator updates are necessary in up to six different situations:

1. whenever at a period boundary (this is a frequent and necessary update, unfortunately);

2. whenever completing for period when executing on a fixed budget with slack to be reclaimed;

3. whenever transitioning from an idle processor to a busy processor;

4. immediately prior to calculating slack availability for any new slack-consuming arrival; (in DEOS, this would be for a thread completed for period wanting to execute further on slack, or a newly arriving ISR thread with an exhausted fixed budget)

5. whenever completing for period when executing on slack; or possibly when preempted by a higher priority slack consumer (but not a higher priority fixed-budget consumer); and 6. before mutex execution by a slack-consuming thread (to predecrement slack accumulators to account for introduced system overheads).

Note that there are semantic changes in the accumulator definitions in this Section 4 when compared with their definition described in Section 2 entitled Slack Scheduling Background. Some of the impacts of this are that the update times for thread completion when running on fixed budget are significantly reduced, but the slack availability calculation frequencies are noticeably increased. The basic difference is that slack accounting is done at each level (compared to cumulative at all levels), which allows for resets at periods to ensure that slack does not persist beyond its expiration times.

Note also that when a user thread is deactivated with an inactive primary budget at level j, slack reverts back to level j, which is not necessarily 1.

4.3.1 Period Boundary Updates

Section 4.2 is devoted to describing slack updates associated with period boundary transitions. The detailed algorithm describing which variables get updated was given earlier as Algorithm 8.

This section emphasizes the differences between the improved slack stealing scheduling algorithm and the known slack stealing algorithm which required no period updates (beyond the hyperperiod reset). The root of the difference stems from the fact that with dynamic thread/process creation, knowledge of the future cannot be assumed, hence available timeline slack at level i can only be calculated for a period, at the start of the period $\tau_i$.

Three implications ensue from this modified formulation:

1. Before a period boundary, the amount of aperiodic slack consumed which is shown in Algorithm 14 below must be calculated if the TimelineSlack$_i$'s are not current. The values of TimelineSlack$_j$'s, $1 \leq i \leq j$ must be updated prior to the completion of every period $\tau_j$, since they are used in the period boundary update code. It does not hurt to update TimelineSlack$_j$, $1 \leq j \leq n$.

2. Before a period boundary, the amount of idle time accumulated (i.e. the Idle$_j$'s) and the amount of lost time for reclamation (i.e. the $L_j$'s) needs to be updated before every period boundary $\tau_j$. This amounts to calling comparable code to Algorithm 13. It does not hurt to update $Idle_j$ and $L_j$, $1 \leq j \leq n$.

3. Comparable code to the pseudo code shown in Algorithm 8 must be executed at period boundaries. This is executed after the idle and aperiodic accumulators have been updated.

4. Lastly, if all available slack is to be consumed, the actual slack available must be recalculated every time a slack consumer is ready to resume (since more slack may have become available either from thread reclamations or from period timeline slack). It is conservative (i.e. safe) to defer slack updates until a downward rate change.

The need to recalculate available slack at level i every period $\tau_i$ for i>1 suggests a couple of different slack evaluation options, which we defer until Section 4.4. Our algorithms assume the maximal number of updates described above.

4.3.2 Fixed Budget Thread Completion Updates

In the known slack stealing algorithm, in the absence of requests for slack, slack accumulator variables need updating when each periodic thread completes (or when transitioning from an idle period to a busy period). In DEOS, this would correspond to slack variable updates after the completion of an aggregate thread. In fact the only update required is when a fixed budget level i thread is to increase the values of reclaimed slack if the thread has completed for period early.

Pseudo-code for updating slack accumulator variables is given by Algorithm 12 (Appendix B). Algorithm 12 updates the reclaimed slack variables used when computing slack availability. It is called whenever a task executing on fixed budget completes for period. The same algorithm applies whether doing incremental or aggregate updates.

Since there is so little overhead associated with slack stealing when completing for period, reducing overhead is not a significant motivation for using aggregate threads. One possible motivation in favor of a reduced number of updates (like aggregate threads) is a potential reduction in the number of times that the slack availability calculation is to be made.

Many of the algorithms in this section assume aggregate updates, but for practical purposes, incremental updates initially seem the best way to go due to their simplicity. Required modifications to go from aggregate to incremental updates are minor. We call updating upon completion of an aggregate thread an aggregate update. Analogously, we call updating slack variables upon the completion of each thread an incremental update.

Within a rate, explicit prioritization of threads is disallowed in DEOS since threads can either choose to wait (when they have no predecessors) or are forced to wait (when they have predecessors). This differs from RMS in that threads with equal rates would arbitrarily be assigned a fixed priority. In the absence of priority inversions or delays, all threads of a given rate execute sequentially and an aggregate update is a natural way to think about updates.

In one embodiment, incremental updates will be provided for at least two reasons. First, the overhead per update is minimal, and incremental updates provide a more uniform solution. Second, aggregate updates implies that all threads at rate i must complete for period before any at rate i can begin consuming slack. Because threads at rate i can wait for resources, while others are complete for period, an aggregate update might prevent slack at level i from being consumes (per giving priority to a slower rate thread or worse, idle).

Table 10 (Thread State Time Variables) (Appendix A) suggests a set of thread attributes that will provide the necessary execution time information. The TimeSlice attribute is used to indicate the amount of time allocated to a thread before an intermediate timeout expires. Alternative sets are possible, of course.

The attribute ExecTime provides a mechanism for determining the reclaimed slack. Specifically, at the completion of a periodic thread (within its period), the amount of slack reclaimed from that thread is ComputeTime—ExecTime.

Note that calculation can be applied to slack consumption once the fixed budget has expired. When a thread is executing on slack, the value of ComputeTime is set to the slack available at the time of request. However, this model for slack consumption holds only if no other threads consume granted slack between the time slack is allocated and the thread executing on slack completes. (The notion of granted slack is defined in Section 4.4. For now, it can be taken to be any allocated slack.)

When one slack-consuming thread preempts another slack-consuming thread, no slack is reclaimed (at preemption time) from the preempted thread, and both ExecTime and ComputeTime for the preempted thread should be set to zero after updating the slack accumulators A-aperiodic. This all occurs prior to making the slack availability computation for the thread attempting preemption.

If the set of attributes in Table 10 corresponds to an aggregate thread, then the equivalent information must be maintained on a per thread basis if slack is to be reclaimed incrementally as threads complete. If this capability is desired, the verification effort might be slightly decreased in the case of incremental updates from the perspective of simpler code. However, it may actually complicate testing, since many more "cases/sequences of events" can now occur.

Reclaimed slack at level i cannot apply all at once to level j<i, and must be somehow "spread" over the remainder of the current $\tau_1$ period. The current $\tau_1$ period is defined by $[\gamma_1(t) T_1, (\gamma_i(t)+1) T_i]$, where t is the time that $\tau_1$ completed for period. Currently, reclaimed slack at level i is not made available to rates $j \in \{1, \ldots, i-1\}$.

Note that if $R_1$ is the amount of reclaimed slack at level i, and $B_j^r$ are the number of remaining full periods of duration $T_j$ in the current period $T_i$, then each of the remaining full periods may have $R_1/(B_j^r+1)$ units of time allocated to slack requests.

If $R_i$ is the amount of unused worst-case fixed budget to be reclaimed from $\tau_1$, then the amount of slack that can be given to level j requestors (j<i) in the current period defined by $T_j$ is the minimum of $R_i$ and the difference between the next start of period $T_j$ and the current time plus any remaining unused ISR budgets, i.e. $\min(R_1, (\gamma_1(t)+1)T_j - (B_j^r(t))$.

4.3.3 Idle to Busy Transition Updates

Idle accumulator slack variables ($Idle_i$, $1 \leq i \leq n$) are updated when transitioning from an idle processor to a busy processor. This update requires knowledge of how long the processor spent idle.

Pseudo-code that updates the idle slack variables when transitioning from idle to busy is provided by Algorithm 13 (Appendix B). Algorithm 13 is called whenever the idle task completes (at priority (n+1)). The idle process is denoted by $\tau_{n+1}$. Update_time=the worst-case time to execute this routine.

In DEOS, there is an idle process that runs in "background" mode. In terms of the idle accumulator updates in Algorithm 13, the idle process can be thought of as $\tau_{n+1}$ running at priority n+1. However, the idle thread has no fixed compute time budget (unlike $\tau_j$, $1 \leq j \leq n$).

The idle thread may need a non-zero budget, because it does things like thread/process deletes, some portions of which are executed critical sections (so there may be some minimal fixed budget).

In one embodiment, the idle process' execution time updates at the clock tick, so idle time will never be greater than $T_1$. Relaxing this assumption is not entirely straightforward and introduces additional, perhaps non-trivial bookkeeping. A case statement of ranges in where the idle_time consumed is necessary for threads that can wait for resources while holding their budgets. The difficulty arises when a thread waits for a resource, does not release its budget, sufficient idle time elapses to chisel into the reserved budget, then the thread decides to give its entire budget to slack (after some of it has been consumed by idle).

In DEOS, only ISR threads wait for resources without giving their budget to slack while waiting, and ISR threads are scheduled only at rate 1. So it will be the case that $C_j=0$ for j=2, ..., n, which allows for several implementation optimizations. Note also, that the $C_j$ will need to be updated at thread activation/deactivation. The notation $C_j$ was chosen because the value of $C_j$=the compute time of $\tau_j$ is certainly conservative. However, $C_j$ in this algorithm may be much smaller, so the variable name is overloaded.

Note that idle variables must have been updated before period boundary updates. In many cases, this will happen automatically because new threads will be scheduled at the period boundary, but updates are still necessary when the idle process will continue running.

In one embodiment, zero fixed budget slack-consuming threads are not supported. Such a class of threads would not be allowed to access resources or otherwise introduce overheads associated with blocking. Consequently, every slack-consuming thread must run at some rate and have some non-zero fixed budget. The implications of this are that no slack-consuming threads can run at priority n+1, or equivalently in background mode. In other embodiments, priorities can be introduced among slack-consuming threads at a particular rate.

It is noted that if slack were time partitioned, there would have to be several "idle" threads, and only the idle time spent in the time partition would be applicable. Unique association of an idle interval with a process may pose challenges; however, with pooled system level slack, there is only a single idle "process".

4.3.4 Before and After Slack Consumption

No difficulties are posed in detecting times before and after slack consumption. Note that slack variable updating is a different activity than computing slack availability. However, with the reevaluation of dynamic timeline slack at each period $T_1$, it may be most convenient to update the slack consumed (i.e. the AperiodicTime$_j$), update the period timeline slack, and then recalculate slack availability. Note that a thread executing on slack to resume after a period boundary must have its timeslice reset; however, this maximal update approach may incur significant overhead.

Slack variable updates are always necessary prior to computing slack availability to ensure that the calculated value for available slack is not optimistic. Slack variable updates after consuming slack is analogous to slack variable updates upon thread completion, and they might be deferrable until either a new request for slack arrives, or a downward rate transition occurs (i.e. DEOS transitions from executing a higher rate thread to a lower rate thread).

Pseudo-code to update the aperiodic slack variables used when computing slack availability is provided by Algorithm 14 (Appendix B). Algorithm 14 is called whenever an aperiodic task completes, which might include surplus compute time for a periodic task increment, or the idle task completing. update_time=the worst-case time to execute this routine, a constant (perhaps dependent on i).

The aperiodic task t may execute over several time increments; i.e., it may be scheduled, consume all slack, suspend itself, be rescheduled when more slack is available, etc.

Algorithm 14 contains pseudo-code appropriate for updating the aperiodic accumulators, and it is O(n). It makes reference to a slack data structure shown in Table 11 (Slack Record Attributes) (Appendix A). The slack record keeps track of how much slack has been reclaimed at each level ($R_i$), and how much level i only unused slack can be carried forward ($U_i$). Some additional variables are used in candidate algorithms to reduce the number of required updates.

In Algorithm 14 timeline slack has be decomposed into amounts available at each particular rate, where a requester at rate j can consume all available slack at rates k, $1 \leq j$ 23 k. In general, level i slack is consumed before level i+1 slack since it expires first. Thus the algorithm simply starts at level 1, increments AperiodicTime$_1$ by the minimum of slack consumed and slack available at level 1 prior to slack consumption, decrements the amount of slack consumed, and continues up through the slower rate slack levels until all slack has been included in the AperiodicTime$_j$'s. Note that all attributable slack will be consumed.

Note that aperiodic variables must have been updated before period boundary updates. In many cases, this will happen automatically because preempting threads will be scheduled at the period boundary, but updates are still necessary when a slack-consuming thread is running and will not be preempted at a period boundary.

Note also that if a task has been granted slack, there are no guarantees that it will receive all slack that was said to be available. In particular, the activation or arrival of a higher priority slack-consuming thread would result in the loss of slack. In this sense slack is only offered on a best effort basis. A small amount of slack is predecremented from the accumulators, which guarantees that context swaps will be covered, but in general, guarantees are provided through the use of a slack queue of pending requests.

In the next section, we introduce an invariant similar to the one used for ISR threads running on their fixed budget to account for overheads incurred by slack consumers. This invariant holds whenever scheduling slack, not just before resource use.

4.3.5 Before and After Monitor and Resource Use

In terms of accounting for system overheads, slack-consuming threads pose many of the same problems as do ISR threads. Fortunately, a similar accounting solution for ISR threads applies to threads executing on slack.

In particular, a similar invariant applies to threads executing on slack (periodic or ISR) as to ISR threads executing on fixed budget: "The scheduler shall never permit level i threads ExecutingOnSlack without at least 2*contextSwitchPlusDelta+CacheBonus+SlackVarUpdateTime level i slack available to begin/resume execution or to wait for resources."

In addition to requiring a minimum amount of available slack, the slack accumulators must be predecremented, should the requesting thread be preempted by another slack consumer. This is accomplished by calling UpdateAperiodicSlackVariables in Algorithm 14 with the calling thread's execution_time_since_last_scheduling set to 2*contextSwitchPlusDelta+CacheBonus.

Note that this invariant holds whenever scheduling a slack-consuming thread, not just prior to a waiting for a resource request by a slack-consuming thread. In particular, feasibility (as determined by the invariant) is checked prior to initial scheduling, and ordinary resumption of threads executing on slack in addition to any requests to wait for resources.

The rationale behind this is that contextSwitchPlusDelta covers the overhead costs of the needed context switch necessary to begin executing the requesting thread. Another contextSwitchPlusDelta covers the costs of the unpredictable context switch necessary to resume the preempted thread. The CacheBonus allows for a worst-case rewrite of the cache when resuming the preempted thread. (In fact, CacheBonus and contextSwitchPlusDelta are added to the remaining budget of the thread being preempted.) Plus, an additional SlackVarUpdateTime is required which is consumed when predecrementing the slack accumulators.

Note that CacheBonus+contextSwitchPlusDelta is transferred to the budget of the thread being preempted Oust like it is when an ISR thread operating on fixed-budget preempts a thread).

Note that if upon completion of holding a resource or a timeout, there is a downward rate change (e.g. releasing a mutex lock or expiring its time limit), slack accumulators must be updated at the priority of the mutex. If there is no downward rate change, slack accumulator updates can be deferred.

Threads that can both execute on slack and either lock mutexes and/or wait for resources must have a minimum fixed budget equal to the resource locking time. For the case of mutexes, this is worst-case execution time for the (nested) mutex. For other resources, it is just the overhead needed to cover the cost of context swaps (i.e. 2*contextSwitchPlusDelta+CacheBonus). The reason for requiring a minimal fixed budget is that a TBE (time budget exceeded) exception does not lower the priority of the thread holding a mutex, and predecremented slack will have expired when the thread becomes active the next period.

4.4 Slack Allocation

To reiterate, when threads/processes can be dynamically updated, available slack calculations for slower rate threads need to be made more frequently, if all available slack is to be consumed at the requestors' rate. Also, note that in one embodiment slack reclaimed at level i may not available for consumption at level j, where j<i, although it may be in other embodiments.

Pseudo-code that determines the available slack is provided by Algorithm 15 (Appendix B). Algorithm 15 returns an n-vector of slack time=(S(1),S(2), ..., S(n)). This algorithm calculates the slack available beginning at the time of the call, say s and ending at the ends of periods defined by $((\gamma_1(s)+1)T_1, (\gamma_2(s)+1)T_2, \ldots, (\gamma_n(s)+1)T_n)$. Note that more period timeline slack may become available in these intervals after this request. This differs significantly from previously known slack stealing algorithms.

In practice, if the slack available at any level is too small to cover the cost of context swaps plus other overhead, using it causes a negative effect. $\delta$ and cacheBonus are selected based on system overheads beyond cswaps. UpdateAperiodicSlackVariables should be called prior to execution of this routine, when necessary. UpdateIdleSlackVariables will have automatically been called prior to execution of this routine.

Before looking at the details of the slack availability computations, we consider more broadly the question of slack allocation policies that may impact performance and/or fairness (in DEOS or in other embodiments). We list two possible optimizations here, and then we describe them at the end of this section.

1. Reclaimed slack from threads completing for period at level i should not be allocated to levels $1, \ldots, i-1$. From an implementation view, this is clearly easiest to implement and also offers the advantage of providing a form of fairness among rates. Reclaimed slack from level i is available only to threads at level $i, \ldots, n$.

In particular, if there are always high rate slack consumers, then they will be able to starve lower rate slack consumers of all slack made available to them.

The negative side of this is that reclaimed slack at level i is not made available to higher priority slack consumers in the absence of level i or lower priority slack consumers. To overcome this, we introduce the idea of slack level descent or equivalently, slack priority descendence, which is explained later in this section.

2. Slack availability updates can sometimes be delayed. More specifically, slack need not be recomputed at level i each time slack becomes available at level j for j<i. The benefits of this are that higher priority slack consumers might execute on slack not already allocated to a slower rate slack consumer, leaving the amount of slack previously allocated at level i intact. Updates can also be deferred when more reclaimed slack becomes available at level j when executing a slack consumer at level i, $j \leq i$.

Algorithm 15 is called to compute the available slack. A row vector of length n is returned containing the slack available at each level. Just prior to computing slack availability, all idle accumulators and aperiodic accumulators must have been updated. Idle accumulators are automatically updated when transitioning from idle to busy (which would have occurred prior to making a slack availability calculation). However, the aperiodic accumulators need not be updated (for example, a slack consumer preempting another slack consumer). Consequently, Algorithm 14 must have been executed prior to calling AvailableSlack in Algorithm 15.

The following provide some comments on overheads. Prior to either starting/resuming a thread executing on slack or waiting for a resource while on slack, several steps must occur to both account for overheads and determine how much slack is available:

1. To get an estimate of how much slack is now available, the idle accumulators and/or aperiodic accumulators need to be updated. This amounts to calling the code in Algorithms 14 and/or 15.

2. Next, the available slack must be calculated. This amounts to calling the code in Algorithm 15.

3. Last, if sufficient slack is available at the priority requested, the slack accumulators are predecremented by an amount sufficient to allow for context swaps and caching effects. This entails one more call to the code in Algorithm 14.

The point here is that optimizations should be made whenever they can, even though each routine is only O(n) complexity.

4.4.1 Slack Priority Descendence

4.4.2 Deferred Slack Accumulator Updates

It may be the case that there is insufficient slack available for a level j request, but sufficient slack available for a level k request, k>j. This situation occurs first if the amount of slack at level j is less than 2(cswap+δ)+cachebonus), and second if slack has been reclaimed at level k (which is not visible to level j).

If there is insufficient slack available for a level j request, but there is sufficient slack available to allow a level k request to be schedulable, k>j, then the level k slack consumer can be made to run.

Note that more level j slack will become available at the next period of $T_j$, which is before the next period of $T_k$. At that time, the level k slack consumer will be preempted to favor the level j slack consumer (if slack priorities as defined by rate are observed). Repeated situations like this might lead to a lot of slack accumulator updates, and potentially a lot of overhead. Providing guaranteed slack would save on some of the updates, since higher priority slack consumers would then be viewed as a preemption, but requests for later slack would not have to be made by the preempted slack consumer.

4.5 Consistent Slack Values under Fault Conditions

Below is a list of fault conditions:
1. Time synchronization due to clock drift. It is assumed that we only move forward in time, and that we know the old time from which we are jumping. Time synchronization points are always at period boundaries.
2. Process/thread restarts.
3. Processor restarts.
4. Other transient errors.

Figure 18A:
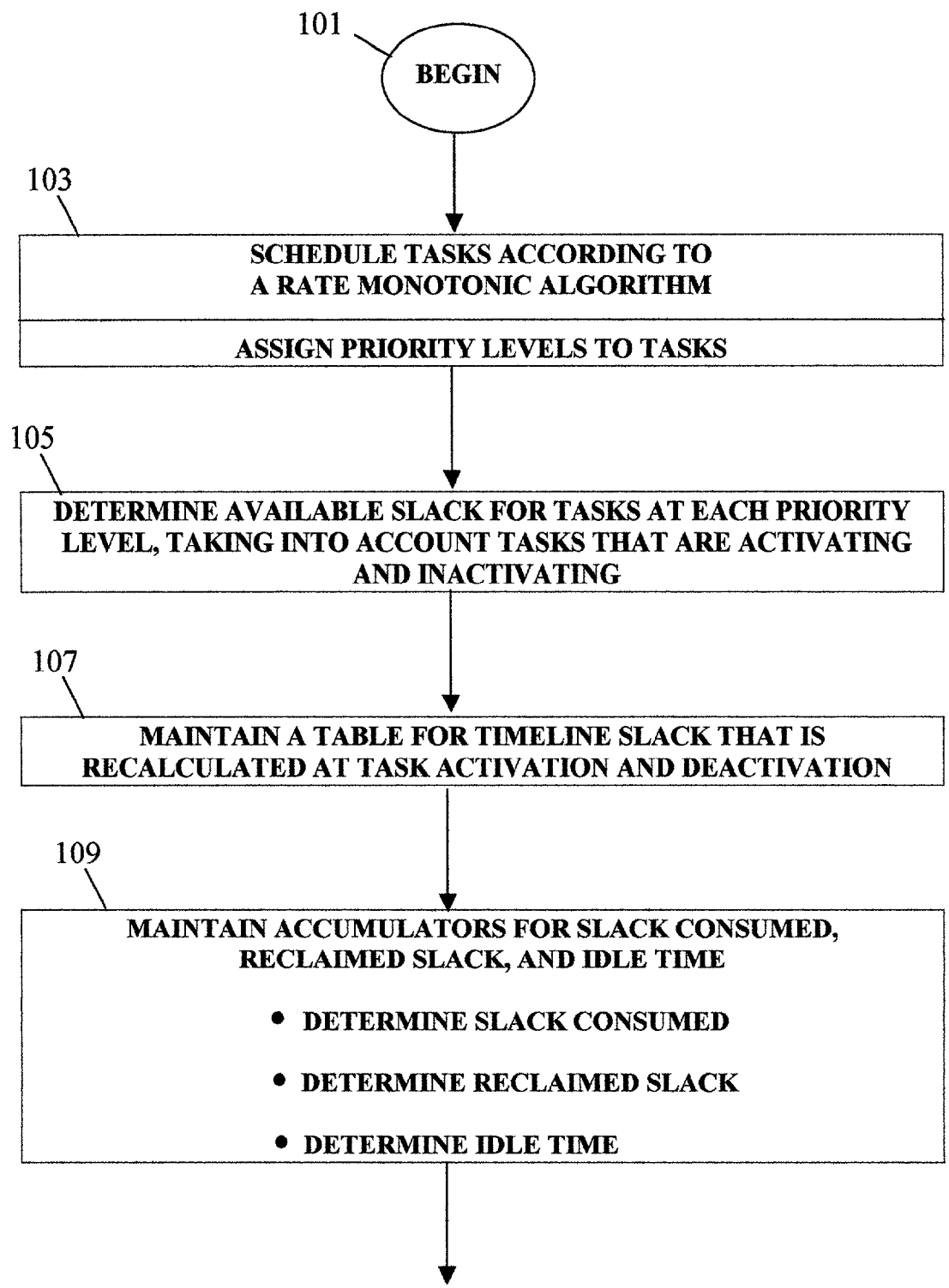

Section 5—Methods of Exemplary Embodiments of the Invention, and Machine-Readable Medium FIGS. 18A and 18B together are a process flowchart encompassing various methods of task scheduling that employ slack stealing in a system executing harmonic and dynamic tasks, in accordance with an embodiment of the invention. FIGS. 18A–B are a process flowchart having action boxes 101, 103, 105, 107, 109, 111, 113, 115, and 117.

The methods begin in box 101. In box 103, a multitasking system schedules tasks according to a rate monotonic algorithm. As part of the scheduling, priority levels are assigned to various tasks.

In box 105, available slack is determined for tasks at each priority level, taking into account tasks that are activating and/or inactivating at unpredictable times. Boxes 107 through 111 provide various implementations to determining available slack. In box 107, a static table is maintained for timeline slack. The slack table is recalculated at task activation and task deactivation.

In box 109, accumulators are maintained to keep track of slack-related parameters including slack consumed, reclaimed slack, and idle time. Based on the contents of the accumulators, slack consumed, reclaimed slack, and idle time can all be calculated.

In box 111, the accumulators are updated upon the occurrence of an event from the following group:
when crossing a period boundary,
when a task completes for period when executing on a fixed budget with slack to be reclaimed,
when a processor executing the tasks transitions from idle to busy,
when a task completes for period when executing on slack,
prior to calculating available slack for a new slack-consuming task, and
before mutex execution by a slack-consuming thread.

In box 113, the accumulators are predecremented to allow for overhead associated with allocating slack, such as context swaps, cache refreshes, and so forth.

In box 115, slack is allocated to tasks according to their priority, with highest priority tasks being allocated slack first. As a result, an aperiodic high priority task can steal slack from a periodic low priority task without impacting the periodic task's hard execution deadline.

In box 117, the methods end.

The operations described above with respect to the methods illustrated in FIGS. 18A–B can be performed in a different order from those described herein. It will also be understood that while Begin and End boxes are shown, the methods will normally be continuously performed.

Figure 19:
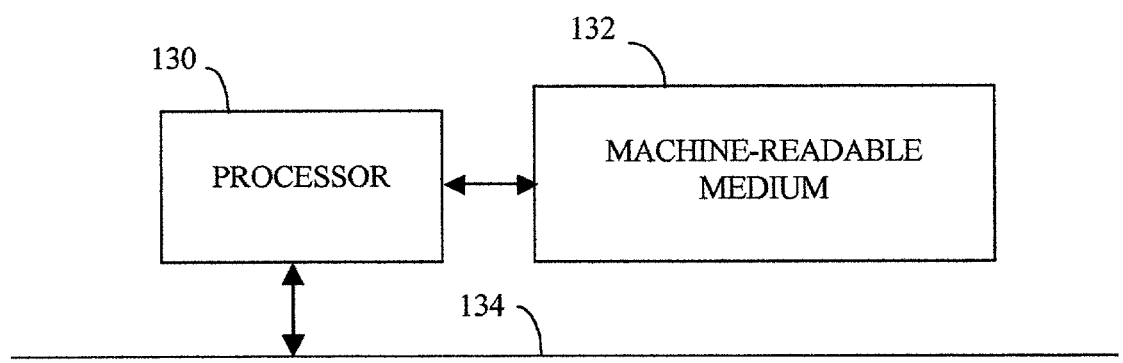
FIG. 19 depicts a block diagram of a processor coupled to a machine-readable medium.

FIG. 19 depicts a block diagram of a processor 130 coupled to a machine-readable medium 132. Processor 130 may be further coupled to bus 134 for communication with other processors and/or with other components of a data processing system. Machine-readable medium 132 may include fixed devices coupled to processor 130, such as an internal storage medium or programmable memory device. Machine-readable medium 132 may further include removable devices coupled to processor 130, such as a removable storage medium or programming cartridge. Machine-readable medium 132 contains instructions stored thereon, in machine-readable format, capable of causing processor 130 to carry out the methods described herein.

Section 6—Conclusion of the Detailed Description

The present invention provides both apparatus and methods for a task scheduler that can provide slack-stealing in a real-time environment that encompasses periodic and dynamic tasks. Computer systems that can perform as described herein are commercially desirable in many types of real-time control systems, including but not limited to aerospace flight control and industrial process control systems.

The various embodiments of the invention can be used to define electronic systems to carry out the task scheduling activities of multitasking systems. The electronic systems described make use of a variety of electronic equipment having one or more processors utilizing instructions in machine-readable form to carry out the methods described herein.

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

TABLE 1

Periodic Task Set

| Task ID | $T_i$ | $C_{b,i}$ |
|---|---|---|
| $\tau_1$ | 6 | 1 |
| $\tau_2$ | 7 | 1 |
| $\tau_3$ | 21 | 2 |

TABLE 2

Periodic Thread Specification in Classical RMS

| Notation | Description |
|---|---|
| $\tau_i$ | The task in a process with priority level i. In traditional RMA, $\tau_i$ is a single thread and the whole system is a single partition. In DEOS, we call $\tau_i$ an aggregate thread. There are many threads running at the same rate in DEOS. So, if $t_{i,1}, t_{i,2}, \ldots, t_{i,n_i}$ are all the threads defined for rate i, $\tau_i$ is the sequence of these threads when run back-to-back. This representation allows us to consider slack only in terms of rates and not in terms of threads which potentially helps performance significantly. |
| n | The number of distinct (aggregate) threads allowed in the system. This number is fixed at system power up. |
| $T_i$ | The time between dispatches of $\tau_i$. We assume without loss of generality that $T_1 \leq T_2 \leq \ldots \leq T_n$. $T_i$ is also called the period of $\tau_i$. In DEOS, strict inequality holds. |
| H | The hyperperiod of the task set. $H = lcm(T_1, T_2, \ldots T_n)$. Note that in a harmonic system such as DEOS, $H = T_n$. |
| $\tau_{ij}$ | The $j^{th}$ dispatch of $\tau_i$. Again, in DEOS, $\tau_{ij}$ is an aggregate thread. |
| $C_{ij}$ | The worst case execution time for $\tau_{ij}$. In classical RMS the task set is fixed so $C_{ij} = C_i$ for each dispatch j where $j = 1, \ldots, \frac{H}{T_i}$. Note that this quantity is computed at each successful schedulability test. |
| $C_i$ | A short hand notation for $C_{ij}$ when $C_{ij} = C_{ik}$ for all $j, k \in \{1, \ldots, \frac{H}{T_i}\}$. |

TABLE 3

Slack Scheduling Specification in the Context of Classical RMS

| Notation | Description |
|---|---|
| $n_{i/j}$ | The value $\frac{T_i}{T_j}$ for $i \geq j$. $n_{i/j}$ is the number of times $\tau_j$ will execute during one period defined by $T_i$. For a harmonic system, all $n_{i/j}$ are integers. |
| Timeline Slack$_i$ | The level i slack in the interval $[0, j \cdot T_i]$ assuming all periodic processes take their worst case execution time to complete. |
| $E_i$ | The dispatch identifier of the next instance of $\tau_i$ to complete. If $\tau_i$ is in state Completed-ForItsPeriod, this is the next instance, otherwise it is the current instance. This value must be maintained at runtime. When aggregate threads are supported, one state variable per thread may be necessary. |
| Aperiodic Time$_i$ | The amount of level i or higher aperiodic time that has been consumed since the beginning of the hyperperiod. This includes all time consumed by aperiodic task of priority $1, \ldots, i$, where periodic process overrun can be considered aperiodic process computation time. There is an implicit time argument, so Aperiodic Time$_i$ = Aperiodic Time$_i(t)$. |
| Idle$_i$ | Level i idle time that has occurred since the beginning of the hyperperiod. This is all the time not spent processing tasks of priority i or higher. In other words, it is all the time spent processing tasks (periodic, aperiodic or idle) of priority $i + 1, \ldots, n, n + 1$ where n is the number of rates in the system and level n + 1 is the idle process. There is an implicit time argument, so Idle$_i$ = Idle$_i(t)$. |
| $\tau_i$ | The dispatch identifier of $\tau_i$, or equivalently the period identifier of $T_i$. There is an implicit time argument, so $\gamma_i(t) = \gamma_i$. |
| $L_{ij}$ | The amount of level i − 1 slack available in $[0, j \cdot T_i]$ which is the amount of time available for processing tasks at level i − 1 without causing $\tau_1, \tau_2, \ldots, \tau_i$ to miss any of their deadlines in that interval. |

TABLE 4

Timeline Slack$_{i,j}$

| Dispatch ID | 1 | 2 | 3 | 4 | 5 | 6 | 7 |
|---|---|---|---|---|---|---|---|
| Timeline Slack$_{i,j}$ | 5 | 10 | 15 | 20 | 25 | 30 | 35 |
| | 4 | 9 | 14 | 19 | 24 | 29 | |
| | 12 | 25 | | | | | |

TABLE 5

TimelineSlack$_{i,j}$

| Dispatch ID | 1 | 2 | 3 | 4 | 5 | 6 |
|---|---|---|---|---|---|---|
| TimelineSlack(1,30) | 4 | 8 | 12 | 16 | 20 | 24 |
| TimelineSlack(2,30) | 6 | 12 | 18 | | | |
| TimelineSlack(3,30) | 10 | | | | | |

TABLE 6

Thread Services

| Thread Services | Description |
|---|---|
| createThread | Creates a new thread. If the thread is dynamic, it also starts the thread. |
| startThread | Schedules to have the (static) thread started at the beginning of the next period defined by the threads rate, after the start service has completed. |
| startThreads | Schedules to have the set of threads started at the beginning of each of their respective periods defined by their rates, after the start threads service has completed. |
| restartThread | An active thread is restarted from the beginning. |
| killThread | An active dynamic thread is deactivated. A stopped static thread is also deactivated. |
| stopThread | This routine is newly added. Static threads must first be stopped before they can be killed. |
| waitUntilNextPeriod | The calling thread is suspended until the start of its next period where it resumes execution. Other threads queued at a mutex that the calling thread holds will be dequeued. |
| restartProcess | All the process' threads, mutexes and events are killed. The process' PRIMARY THREAD is restarted. |
| createMutex | Creates a mutex that can be accessed by multiple threads in the calling thread's process. |
| lockMutex | The calling thread is granted the lock if the mutex is unlocked and queues if wait_ok is sc true. |

TABLE 6-continued

Thread Services

| Thread Services | Description |
|---|---|
| unlockMutex | A thread releases its lock on a mutex and the lock is granted to the highest priority thread (if any) waiting. |
| resetMutex | All threads queued at the mutex are dequeued (including an executing thread). |
| waitForEvent | The calling thread is suspended until the event is pulsed. |
| pulseEvent | All threads currently waiting for the pulsed event will transition from state suspended to state ready. |

TABLE 7

Periodic Thread Notation

| Notation | Description |
|---|---|
| $\tau_i$ | The aggregate of threads with priority level i. We call $\tau_i$ an aggregate thread. |
| n | The number of distinct rates allowed in the system. This number is fixed between coldstarts. |
| $t_{i,j}$ | The $j^{th}$ thread of priority level i. Even though there is no explicit ordering of threads within a priority level, it is convenient to do so for the sake of reference. |
| $T_i$ | The time between dispatches of $\tau_i$. We assume without loss of generality that $T_1 < T_2 < \ldots < T_n$. |
| $\gamma_i$ | The period identifier. At time t where $t \in [0, H]$, $\gamma_i(t) = $ $$\gamma_i = \left\lceil \frac{t}{H} \right\rceil.$$ |
| $m_i(t)$ | The number of active threads forming $\tau_i$ at time t. For ease of exposition, the t is often omitted and refers to the current period of $T_i$ so $m_i(t) = m_i$. Note that there is a time lag between thread creation and thread activation. |
| $m_i^1$ | A temporary value for $m_i$ when threads will but have not yet become (de)activated. |
| $C_i$ | The worst case budget times summed over all threads forming $\tau_i$. |
| $n_{ij}$ | The value $\frac{T_i}{T_j}$ for $i \geq j$. $n_{ij}$ is the number of times $\tau_j$ will execute during one period defined by $T_i$. |
| $\zeta_k$ | The primary budget of process k, $k \in \{1, \ldots, p\}$, p = number of active processes. Note that a process can be active and have its primary thread stopped, in which case some portion of its budget is available as timeline slack. This is poor notation actually since the set of active processes changes. |
| Z | The set of all processes whose unallocated primary budgets are available for slack. |
| $\zeta$ | The sum of the $\zeta_k$ with budgets available for slack. $\zeta = \Sigma_{k \in Z} \zeta_k$. |
| $U_B$ | System level utilization reserved for blocking times. A feasibility test is always of the form $U \leq 1 - U_B$. |

TABLE 8

Slack Scheduling Notation

| Notation | Description |
|---|---|
| $A_i$ (also Timeline Slack$_i$) | is the amount of timeline slack that was made available from processes with inactive primary thread budgets with rate i at time $\gamma_i(t)T_i$. Note: $A_i$ is not cumulative since the beginning of the hyperperiod. Also, in the current release of DEOS, it is always true that $A_j = 0$ for $j \in \{2, \ldots, n\}$. |
| $\Delta A_{i,j}$ | The amount to change rate $A_i$ the next time the start of periods defined by $T_j$ and $T_i$ coincide. It will be the case that for i –> j, $\Delta A_{ij} = 0$. Values of $\Delta A_{ij}$ are updated to reflect user thread (de)activation requests at level i with an inactive primary thread at level j. Note also that if there are no primary threads active at rate i, then $\Delta A_{ij} = 0 \forall j$. |
| $m_i$ | The number of threads in aggregate thread $\tau_i$ for $i = 1, \ldots, n$. $m_i = m_i(t)$. |
| $t_{i,k}$ | The $k^{th}$ thread in $\tau_i$, for $k = 1, \ldots, m_i$. |
| $\beta_{i,k}$ | The budget of $t_{ik}$. Set when $t_{ik}$ is created. |
| $\xi_{i,k}$ | The actual execution time of $t_{ik}$ for the current dispatch. If the current dispatch has completed then it is the total time that dispatch of $t_{ik}$ took to execute. $0 \leq \xi_{ik} \leq \beta_{ik}$. |
| $E_i$ | A boolean value indicating $\tau_i$'s activation status. If $\tau_i$ is active, $E_i$ = TRUE otherwise $E_i$ =FALSE. This value is maintained at runtime. the amount of level i aperiodic time consumed in $[\gamma_i(t)T_i, t]$. For simplicity, we denote AperiodicTime$_i(t)$ = AperiodicTime$_i$. |
| Aperiodic Time$_i(t)$ | |
| Idle$_i(t)$ | the amount of "level" i idle time (i.e. time spent running the idle process) in $[\gamma_i(t)T_i, t]$ no longer available to slack. For simplicity we denote Idle$_i(t)$ = Idle$_i$. |
| $L_i(t)$ | a conservative estimate of the amount of level i idle time that is lost as level i reclaimed slack due to sitting idle. |
| $R_i(t)$ | The amount of slack reclaimed by completing for period at level i in $[\gamma_i(t)T_i, i]$. |
| $\gamma_i(t)$ | The period identifier for $T_i$. For $i \in \{1, 2, \ldots, n\}$, $\gamma_i(t) = $ $$\left\lfloor \frac{t}{T_i} \right\rfloor.$$ Alternatively, one can think of $\gamma_i$ as the dispatch identifier for $\tau_i$, $\gamma_i \in \{0, 1, \ldots, H/T_i - 1\}$. |
| $U_k$ | A conservative value of the amount of level k slack available that can be carried over to the next period $T_k$. |
| CurID(i) | This is associated with the system, and uniquely identifies the period $T_i$. Comparisons of the form $P.ReqID(i) \leq CurID(i)$ will appear in the algorithms. Sometimes these will be abbreviated $P.\gamma_i < \gamma_i$, where uniqueness is understood. See comments in the text about counter roll over. |
| USys | System utilization allocated to active processes, including pending requests for creation/activation and deletion/deactivation. Note that USys does not necessarily reflect the current utilization allocated to active processes. |
| $\Delta USys(1 \ldots n)$ | Changes to the actual process utilization allocated to active processes that will take place at the next period boundary of $T_i$, at level i. |
| $n_{ji}^r(t)$ | The remainder of full $T_j$ periods remaining in the current (relative to t) $T_i$ period. In symbols, $n_{ji}^r(t) = \lfloor((\gamma_i(t) + 1) T_i - t)/T_{jL}$. |
| $B_j^r(t)$ | The remainder of any unused fixed budgets belonging to ISR threads at rates $1, \ldots, j$ in the interval $[t, \gamma_j(t) + 1) T_j]$. |
| $B_j^t(t)$ | The sum total of all fixed budgets belonging to ISR threads at rates $1, \ldots, j$ in any $T_j$ period. In this release of DEOS, if B(t) is the worst case "aggregate" ISR fixed thread budget (at time t, since ISR threads can be killed/created), $B_j^t(t) = n_{ji1}B(t)$, a quantity that should be easy to maintain at runtime. |

TABLE 9

Process Record Attributes (Budget Update Vector)

| Notation | Description |
| --- | --- |
| UserBudget | The total amount of time (normalized by the process' primary thread's period) allocated to active users within the process. UserBudget will never exceed MaxBudget, which is the process' entire budget. UserBudget reflects any pending changes indictated by ΔBudgetReq. Consequently, UserBudget is not necessarily the current value of the process' budget assigned to user thread. But that value can be computed. |
| MaxBudget | The process' total budget, normalized by the period of its primary thread. The term budget is somewhat misleading. Utilization is a more descriptive term. |
| Rate | The rate at which the highest priority thread (including the process' primary thread) runs. Note that no user thread of a process p will have a rate higher than the process' primary thread. It is TBD whether there is benefit in having a primary thread with rate higher than any of its users. Rate takes on one of the values 1, . . . , n, with 1 the highest rate, and n the slowest rate. |
| Active | A boolean value set to TRUE when the primary thread is active and false when the primary thread is inactive. When p.Active is FALSE, the primary thread's budget is made available as timeline slack. |
| ProcActive | A boolean value set to TRUE when the process (not just its primary thread) is active, otherwise it is FALSE. ¬ P.ProcActive ⇒ ¬ P.Active (regardless of its value). |
| ReqID(i) | This uniquely represents the most recent time a request for user thread (de)activation has been made at level i. Note: it is not sufficient to use $\gamma_i$ since these table values are not updated "periodically", but only when other (de)activations take place after the requests have been processed. |
| $\gamma_i$ | We sometimes denote P.ReqID(i) by P.$\gamma_i$ where it is understood that P.$\gamma_i$ uniquely defines the request period $T_i$. |
| ΔBudgetReq(i) | This is the amount of change in allocated budget at level i that either will or did occur at time $(ReqID_i(t) + 1)T_i$. If the change hasn't yet occurred, subsequent requests might change this value. |

TABLE 10

Thread State Time Variables

| Notation | Description |
| --- | --- |
| ComputeTime | The total compute time allocated to the thread. A timeout will be enforced to ensure that a thread does not exceed its worst case compute time. |
| CT | An abbreviation for ComputeTime. |
| ExecTime | The total time spent executing so far. This time is updated at each thread preemption or suspension. |
| ET | An abbreviation for ExecTime. |
| TimeSlice | The amount of time a thread is allowed to execute prior to a hardware timeout. Examples of timeouts are maximum mutex execution times and maximum available slack consumption before thread suspension. |
| TS | An abbreviation for TimeSlice. |
| $E_i$ | A boolean, denoted by $E_i$ for aggregate thread $T_i$ which is true if all threads at rate i have a true value for CompletedForItsPeriod and false otherwise. |
| ExecutingOnSlack | A boolean value which is true when a thread's budget current budget has been from taken from the slack pool and false when it is a part of its fixed budget. |

TABLE 11

Slack Record Attributes

| Notation | Description |
| --- | --- |
| Slack | A record perhaps indexed by slack level (depending on the slack consumption algorithms) containing the amount of slack reclaimed at level i, and the most recent period $T_i$ during which it was reclaimed. |
| Slack.$\gamma_i$ | The identifier of the most recent $T_i$ period during which level i slack was consumed. i ∈ {0, . . . , H/$T_i$ − 1}. This attribute is not used in the maximal update set of algorithms. |
| Slack.$R_i$ | The amount of slack reclaimed by completing (early) for period at level i within the "current" period defined by $\gamma_i$. Slack.$R_i$ is set to zero at every period boundary defined by $T_i$. |
| $R_i$ | An abbreviation for Slack.$R_i$, which works only when the slack record is not indexed. |
| Slack.$U_i$ | The amount of unused slack at level i that has been carried forward at time $\gamma_i(t)T_i$. Slack.$U_i$ is recalculated at every period boundary defined by $T_i$. |
| $U_i$ | An abbreviation for Slack.$U_i$, which again works only when the slack record is not indexed. |
| Slack(j) | The slack record associated with a slack consuming thread (if any) at level j. In this situation, slack made available at the higher rates is allocated directly to high rate slack consumers, without taking away (or recalculating) slack previously allocated to low rate slack consumers. This record is not used in the maximal update set of algorithms. |

What is claimed is:

1. In a multitasking system executing real-time harmonic and dynamic tasks that can request activation or deactivation at any time, a method of scheduling tasks comprising:
   assigning priority levels to tasks;
   determining available slack for tasks at each priority level, taking into account tasks that are activating and inactivating; and
   allocating slack to tasks in order of priority.

2. The method of claim 1, wherein tasks are scheduled according to a rate monotonic algorithm.

3. The method of claim 1, wherein an aperiodic high priority task can steal slack from available slack without impacting an execution deadline of a periodic low priority task.

4. The method of claim 1, wherein determining available slack comprises:
   determining slack consumed;
   determining timeline slack;
   determining reclaimed slack; and
   determining idle time.

5. The method of claim 4, wherein determining timeline slack comprises maintaining a table that is recalculated at task activation and deactivation.

6. The method of claim 4, wherein determining available slack comprises maintaining accumulators for slack consumed, reclaimed slack, and idle time.

7. The method of claim 6, wherein tasks have periods, and wherein maintaining the accumulators comprises updating the accumulators upon the occurrence of an event from the group consisting of:
   when crossing a period boundary;
   when a task completes for period when executing on a fixed budget with slack to be reclaimed;
   when a processor executing the tasks transitions from idle to busy;
   when a task completes for period when executing on slack; and prior to calculating available slack for a new slack-consuming task.

8. The method of claim 6, wherein determining available slack comprises predecrementing accumulators to allow for overhead associated with allocating slack.

9. The method of claim 1, wherein the multitasking system is a flight control system.

10. A machine-readable medium having instructions stored thereon capable of causing a processor to carry out a method, the method comprising:
assigning priority levels to tasks;
determining available slack for tasks at each priority level, taking into account tasks that are activating and inactivating; and
allocating slack to tasks in order of priority.

11. In a multitasking system executing real-time harmonic and dynamic tasks which can request activation or deactivation at any time, a method of scheduling tasks comprising:
determining available slack for tasks, taking into account tasks that are activating and inactivating; and
allocating slack to requesting tasks.

12. The method of claim 11, wherein tasks are scheduled according to a rate monotonic algorithm.

13. The method of claim 11, wherein each task has an assigned priority, and wherein an aperiodic high priority task can steal slack from available slack without impacting an execution deadline of a periodic low priority task.

14. The method of claim 11, wherein determining available slack comprises:
determining slack consumed;
determining timeline slack;
determining reclaimed slack; and
determining idle time.

15. The method of claim 14, wherein determining timeline slack comprises maintaining a table that is recalculated at task activation and deactivation.

16. The method of claim 14, wherein determining available slack comprises maintaining accumulators for slack consumed, reclaimed slack, and idle time.

17. The method of claim 16, wherein tasks have periods, and wherein maintaining the accumulators comprises updating the accumulators upon the occurrence of an event from the group consisting of:
when crossing a period boundary;
when a task completes for period when executing on a fixed budget with slack to be reclaimed;
when a processor executing the tasks transitions from idle to busy;
when a task completes for period when executing on slack; and
prior to calculating available slack for a new slack-consuming task.

18. The method of claim 16, wherein determining available slack comprises predecrementing accumulators to allow for overhead associated with allocating slack.

19. The method of claim 11, wherein the multitasking system is a flight control system.

20. A machine-readable medium having instructions stored thereon capable of causing a processor to carry out a method, the method comprising:
determining available slack for tasks, taking into account tasks that are activating and inactivating, by:
determining slack consumed;
determining timeline slack;
determining slack reclaimed; and
determining idle time; and
allocating slack to requesting tasks.

21. A multitasking system, comprising:
a processor to execute a plurality of tasks, wherein each task of the plurality of tasks is of a task type selected from the group consisting of periodic and aperiodic, and wherein each task of the plurality of tasks has associated with it at least one worst-case execution time; and
an executive to be in communication with the processor and to control dispatching of tasks on the processor, wherein the executive comprises:
a first module that is to determine available slack, taking into account aperiodic tasks that are requesting activation and deactivation at unpredictable times; and
a second module that is to allocate available slack to aperiodic tasks.

22. The multitasking system of claim 21, wherein the first module is to determines available slack by determining slack consumed, timeline slack, reclaimed slack, and idle time.

23. The multitasking system of claim 21, wherein the executive is to controls the dispatching of tasks according to a rate monotonic algorithm.

24. The multitasking system of claim 21, wherein the first module is to determine timeline slack by maintaining a table and recalculating same when aperiodic tasks are activated and deactivated.

25. The multitasking system of claim 21, and further comprising accumulators to store values representing slack consumed, reclaimed slack, and idle time, respectively.

26. The multitasking system of claim 25, wherein tasks have periods, and wherein the processor updates accumulators upon the occurrence of an event from the group consisting of:
when crossing a period boundary;
when a task completes for period when executing on a fixed budget with slack to be reclaimed;
when the processor transitions from idle to busy;
when a task completes for period when executing on slack; and
prior to calculating available slack for a new slack-consuming task.

27. The multitasking system of claim 25, wherein the first module is to predecrements accumulators to allow for overhead.

28. The multitasking system of claim 21, wherein the multitasking system is a flight control system.

29. In a multitasking system executing real-time processes that can request activation or deactivation at any time, a method of scheduling processes comprising:
assigning priority levels to processes;
determining available slack for processes at each priority level, taking into account processes that are activating and inactivating; and
allocating slack to processes in order of priority.

30. The method of claim 29, wherein processes are scheduled according to a rate monotonic algorithm.

31. The method of claim 29, wherein an aperiodic high priority process can steal slack from available slack without impacting an execution deadline of a periodic low priority process.

32. The method of claim 29, wherein determining available slack comprises:
determining slack consumed;
determining timeline slack;
determining reclaimed slack; and
determining idle time.

33. The method of claim 32, wherein determining timeline slack comprises maintaining a table that is recalculated at process activation and deactivation.

34. The method of claim 32, wherein determining available slack comprises maintaining accumulators for slack consumed, reclaimed slack, and idle time.

35. The method of claim 34, wherein processes have periods, and wherein maintaining the accumulators comprises updating the accumulators upon the occurrence of an event from the group consisting of:

when crossing a period boundary;

when a process completes for period when executing on a fixed budget with slack to be reclaimed;

when a processor executing the processes transitions from idle to busy;

when a process completes for period when executing on slack; and prior to calculating available slack for a new slack-consuming process.

36. The method of claim 34, wherein determining available slack comprises predecrementing accumulators to allow for overhead associated with allocating slack.

37. The method of claim 1, wherein the multitasking system is a flight control system.

38. The method of claim 1, wherein the multitasking system is a real-time control system.

* * * * *